(12) United States Patent
Ikuta et al.

(10) Patent No.: US 6,973,999 B2
(45) Date of Patent: Dec. 13, 2005

(54) BRAKING DEVICE FOR A DUAL BEARING REEL

(75) Inventors: Takeshi Ikuta, Sakai (JP); Ken'ichi Kawasaki, Sakai (JP); Kazuki Hiraizumi, Yamaguchi (JP)

(73) Assignee: Shimano Inc., Osaka (JP)

( * ) Notice: Subject to any disclaimer, the term of this patent is extended or adjusted under 35 U.S.C. 154(b) by 37 days.

(21) Appl. No.: 10/750,869

(22) Filed: Jan. 5, 2004

(65) Prior Publication Data

US 2004/0140163 A1    Jul. 22, 2004

(30) Foreign Application Priority Data

| Jan. 6, 2003 | (JP) | ............................. 2003-000648 |
| Jan. 6, 2003 | (JP) | ............................. 2003-000649 |
| May 30, 2003 | (JP) | ............................. 2003-154602 |
| May 30, 2003 | (JP) | ............................. 2003-154604 |

(51) Int. Cl.[7] .............................................. B60L 7/00
(52) U.S. Cl. ..................................... 188/161; 242/288
(58) Field of Search ...................... 188/67, 156–159, 188/161, 162, 164; 242/288, 223

(56) References Cited

U.S. PATENT DOCUMENTS

| 4,714,208 A | * | 12/1987 | Holahan et al. ............ 242/288 |
| 4,940,194 A | | 7/1990 | Young |
| 6,412,722 B1 | * | 7/2002 | Kreuser et al. ............. 242/288 |

FOREIGN PATENT DOCUMENTS

JP    11-332436 A    12/1990

* cited by examiner

*Primary Examiner*—Xuan Lan Nguyen
(74) *Attorney, Agent, or Firm*—Shinjyu Global IP Counselors, LLP

(57) ABSTRACT

A braking device for a dual bearing reel includes a spool braking unit and a spool control unit. The spool braking unit includes a rotor element that rotates in association with the spool and includes a plurality of magnets sequentially arranged in the rotational direction, a plurality of serially connected coils that are disposed around a periphery of the rotor element in a circumferential direction, and a switch element that is connected to both ends of the plurality of the serially connected plurality of coils. The spool control unit electrically controls the spool braking unit, and includes a circuit board on which the plurality of coils are installed and which is mounted on the reel unit, and a controller that is mounted on the circuit board. This way, insulation on the coil and on a circuit board and secured. It is also easier to assemble a braking device.

18 Claims, 21 Drawing Sheets

BRAKING DEVICE FOR A DUAL BEARING REEL

BACKGROUND OF THE INVENTION

This application claims priority to Japanese Patent Applications Nos. 2003-00648, 2003-00649, 2003-154602, 2003-154604. The entire disclosure of Japanese Patent Nos. 2003-00648, 2003-00649, 2003-154602, 2003-154604 is hereby incorporated herein by reference.

1. Field of the Invention

The present invention relates to a braking device. More particularly the present invention relates to a braking device for a dual bearing reel that brakes a spool rotatively mounted to a reel unit.

2. Background Information

A braking device is provided in dual bearing reels in order to brake the spool, and in particular is provided in bait casting reels in which tackle or the like is mounted to the end of a fishing line and cast out in order to prevent a backlash during casting. Many of these conventional braking devices are of the mechanical type, which use centrifugal force or magnetic force. However, mechanical spool braking devices only generate braking force that is in proportion to the rotational speed of the rotor or the square of the rotational speed, and thus generate braking force even at times when it is not needed. This may cause a reduction in the distance in which the lure will fly when cast.

Accordingly, electrically controlled braking devices are known in the art in which an electricity generation mechanism is provided between the spool and the reel unit, and which can be electrically controlled to adjust the braking force during casting, as seen for example in Japanese Patent Application Publication H11-332436.

Conventional braking devices include a braking mechanism that includes an electricity generation function that includes a magnet arranged on the spool and a coil arranged on the reel unit, a rotational speed detection device that detects the rotational speed of the spool, and a control device that controls the electrical current that flows in the coil. The magnet is fixedly attached to the spool shaft, and the coil is mounted to the reel unit such that that the coil is movable in the spool shaft direction, and also mounted such that the coil is disposed around the periphery of the magnet. Thus, the distance between the coil and the magnet can be changed to manually adjust the braking force. The control device includes a circuit board that is attached to the reel unit, and a controller, e.g., a microprocessor, that is mounted to the circuit board. The circuit board is attached to the inner side surface of the reel unit at a position apart from the spool of the reel unit, and is connected to the coil by a lead wire.

With the aforementioned conventional configuration, it is necessary to connect the coil with the circuit board with a lead wire because the circuit board is disposed in a position away from the spool and because the coil moves in the spool shaft direction. Thus if the circuit board is connected to the coil with a lead wire in a dual bearing reel that is used in locations in which the air is moist and corrosive, the insulation on the lead wire will easily deteriorate. Moreover, the coil must be mounted to the reel unit and the circuit board must be mounted to the reel unit because the coil is mounted on the reel unit such that the coil is movable in the spool shaft direction. This complicates the assembly of the device.

In view of the above, it will be apparent to those skilled in the art from this disclosure that there exists a need for an improved braking device for a dual bearing reel that overcomes the aforementioned problems in the art. This invention addresses this need in the art as well as other needs, which will become apparent to those skilled in the art from this disclosure.

SUMMARY OF THE INVENTION

An object of the present invention is to reduce the poor insulation between the coil and the circuit board and make it easy to assemble a braking device.

A braking device for a dual bearing reel according to the first aspect of the present invention is a device that brakes a spool that is rotatively mounted to a reel unit, and includes a spool braking unit and a spool control unit. The spool braking unit serves to brake the spool, and includes a rotor element, a plurality of serially connected coils, and switch means. The rotor element rotates together with the spool and includes a plurality of magnetic poles arranged around the rotational direction of the rotor such that the polarities of the magnetic poles are sequentially different. The plurality of serially connected coils is disposed around a periphery of the rotor element in a circumferential direction. The switch means is connected to both ends of the plurality of the serially connected plurality of coils. The spool control unit electrically controls the spool braking unit, and includes a circuit board on which the switch means and the plurality of coils are installed and which is mounted on a surface of the reel unit that the surface faces one end surface of the spool, and a control element that is mounted on the circuit board.

In this braking device, electric current will be generated in the coils and the spool will be braked when the switch means is turned on with the spool in the rotational state. The coils are installed on the circuit board mounted to a surface that faces one end surface of the spool of the reel unit. Here, coils that are disposed around the periphery of the rotor can be directly installed on the circuit board because the circuit board is mounted to a surface that faces an end surface of the spool of the reel unit. Because of this, a lead wire that connects the coils and the circuit board will be unnecessary, and bad insulation between the coils and the circuit board can be reduced. Moreover, the coils are also mounted to the reel unit by simply mounting the circuit board to the reel unit because the coils are mounted to the circuit board mounted on the reel body. Because of this, the braking device can be easily assembled.

The braking device for a dual bearing reel according to the second aspect of the present invention is the device disclosed in the first aspect, in which the spool is non-rotatably mounted to a spool shaft, and the rotor element includes a plurality of magnets that are fixedly attached to the spool shaft. The plurality of magnets is arranged around the rotational direction of the rotor element such that the polarities of the magnets are sequentially different. Here, the structure of the rotor element can be simplified because the rotor element is formed by the plurality of magnets fixedly attached to the spool shaft.

The braking device for a dual bearing reel according to the third aspect of the present invention is the device disclosed in the second aspect, further including a cap member that is formed from a non-magnetic material and is disposed at end portions of the plurality of magnets in the spool shaft direction, such that the plurality of magnets are retained on the spool shaft by the cap member and the plurality of magnets are disposed substantially concentric with the spool shaft. Here, the magnets can be easily assembled on the spool shaft without weakening the magnetic force thereof, and the strength of the magnets after assembly can be increased because the cap members are formed from a non-magnetic material.

The braking device for a dual bearing reel according to the fourth aspect of the present invention is the device disclosed in the second or the third aspect, in which the number of magnets equals the number of coils. Here, the output of the coils will be single-phased, and the switch element will be simplified because the same number of coils and magnets are used.

The braking device for a dual bearing reel according to the fifth aspect of the present invention is the device disclosed in any of the first through fourth aspects, in which the plurality of coils are coreless coils that are wound into rectangular frame shapes and further curved into arc shapes along the rotational direction of the spool. Here, it will be difficult for cogging to occur and the rotation of the spool will be smooth because the plurality of coils are coreless. Moreover, it will be easy to maintain the coils in a fixed spaced relationship with respect to the rotor element because the coils are formed into arc shapes along the rotational direction of the spool.

The braking device for a dual bearing reel according to the sixth aspect of the present invention is the dual bearing reel disclosed in any of the first through fifth aspects, in which the circuit board has a coil holder formed from a non-magnetic material attached thereto, and the coils are fixedly attached to the circuit board by being mounted to the coil holder. Here, the coils are easy to mount to the circuit board because the plurality of coils are mounted to the coil holder formed from a non-magnetic material, and the magnetic flux of the rotor will not be disturbed because the coil holder is formed from a non-magnetic material.

The braking device for a dual bearing reel according to the seventh aspect of the present invention is the device disclosed in any of the first through sixth aspects, in which the spool is non-rotatably mounted to a spool shaft, and the plurality of coils are disposed so as to be substantially concentric with an axial center of the spool shaft. Here, it will be easy to maintain the coils in a fixed spaced relationship with the rotor element because the coils mounted to the circuit board are disposed such that they are substantially concentric with the axial center of the spool shaft.

The braking device for a dual bearing reel according to the eighth aspect of the present invention is the device disclosed in any of first through seventh aspects, in which the spool is non-rotatably mounted to a spool shaft, and the circuit board is a washer-shaped member that is disposed so as to be substantially concentric with the spool shaft. Here, the coil can be disposed so as to be substantially concentric with the spool shaft by simply mounting the circuit board to the reel unit because the circuit board is a washer shaped ring member disposed so as to be substantially concentric with the axial center of the spool shaft. In addition, by housing the circuit board inside a flange portion of the spool, the circuit board can be disposed in a space between the reel unit and the flange portion and prevent the fishing line from being pinched therebetween. This way, it is possible to improve the waterproofing of the reel body.

The braking device for a dual bearing reel according to the ninth aspect of the present invention is the device disclosed in any of the first through eighth aspects, further including a first synthetic resin coating film that coats at least a part of the spool control unit and is made of an insulating material. Here, the circuit board, the control element, and the coils will be cut off from the surrounding atmosphere because the coils and the spool control unit having the circuit board and the control element are coated with the first synthetic resin coating film made of an insulating material. Because of this, bad insulation on the coil, the circuit board, and the control element on the circuit board can be reduced.

The braking device for a dual bearing reel according to the tenth aspect of the present invention is the device disclosed in any of the first through eighth aspects, in which the spool control unit further includes a condenser element that is mounted on the circuit board. The condenser element stores electric power produced in the coils and supplies the electric power to the control element. Here, it will be unnecessary to convert the electric current because the condenser element is also disposed on the circuit board. Because of this, the sealing by the synthetic resin coating film can be made permanent, and trouble caused by bad insulation can be reduced.

The braking device for a dual bearing reel according to the eleventh aspect of the present invention is the braking device disclosed in any of the first through tenth aspects, further including electro-optical detection means that is mounted on the circuit board and detects a rotational speed of the spool. The spool control unit brakes the spool based on the rotational speed of the spool detected by the electro-optical detection means. Here, the rotational speed of the spool can be detected without contact with the electro-optical detection means and a variety of controls are performed based on the rotational speed, such as calculating the tension to control the spool, and detecting the peak of the rotational speed to thereafter perform a brake operation. Furthermore, if the second synthetic resin coating film is translucent, the rotational speed of the spool can be reliably detected with the electro-optical detection means.

The braking device for a dual bearing reel according to the twelfth aspect of the present invention is the device disclosed in any of the ninth through eleventh aspects, in which the first synthetic resin coating film is adhered to and formed integral with the spool control unit and the coils respectively by immersing the spool control unit and coils in a liquid synthetic resin base material. Here, because the first synthetic resin coating film is formed by an immersion process, coating formation is easy and each portion can be reliably coated with a coating film even if the portions have complex shapes.

The braking device for a dual bearing reel according to the thirteenth aspect of the present invention is the device disclosed in any of the ninth through eleventh aspects, in which at least the first synthetic resin coating film is made from a synthetic resin that is formed by a hot melt molding process, in which a resin raw material is injected into a mold, such that the first synthetic resin covers at least a portion of the circuit board. Here, the electronic components such as control elements will not be damaged and insulation performance can be maintained at a high level, because the circuit board and the control elements disposed thereon are covered by the first synthetic resin coating film formed by the hot melt molding process, which is carried out at a low temperature and low pressure. In addition, there will no longer be a need to place the electronic circuit device inside a case or the reel unit to insulate it, and the fishing reel can be prevented from becoming too large. Furthermore, the dimensional accuracy of the first synthetic resin coating film can be maintained at a high level, bumps and pits will be reduced, and the aesthetics can be maintained at a high level by the hot melt molding process in which a mold is employed.

The braking device for a dual bearing reel according to the fourteenth aspect of the present invention is the device disclosed in the thirteenth aspect, further including a second synthetic resin coating film that coats at least a part of the coils and a part of the spool control unit on which the first synthetic resin coating film is coated. The second synthetic resin coating film is made of an insulating material. Here, insulating performance can be further improved because the second synthetic resin coating film is formed by an immersion process on either a surface on which the first synthetic resin coating film was formed or on a surface on which the first synthetic resin coating film was not formed.

The braking device for a dual bearing reel according to the fifteenth aspect of the present invention is the device disclosed in any of the ninth through fourteenth aspects, in which at least the first synthetic resin coating film is a translucent coating film. Here, the circuit board, the coils, and the control element can be visually inspected from the outside thereof, and a variety of detections can take place between detectors outside the circuit board even if electro-optical detecting elements are provided on the circuit board.

The braking device for a dual bearing reel according to the sixteenth aspect of the present invention is the device disclosed in any of the ninth through fifteenth aspects, wherein at least the first synthetic resin coating film is a colored synthetic resin through which light passes only partially. Here, because light passes through the synthetic resin only partially, by not forming the second synthetic resin coating film on the receiver portions of the optical sensors, it will become difficult for malfunctions due to misdirected light to occur when optical sensors are used.

The braking device for a dual bearing reel according to the seventeenth aspect of the present invention is the device disclosed in any of the ninth through sixteenth aspects, in which the circuit board is mounted to the reel unit with a plurality of screw members having head portions, and the first synthetic resin coating film does not cover portions of the spool control unit on which the head portions of the screw members are disposed. Here, the insulation performance can be maintained at a high level because, with the exception of the regions in which the head portions of the screw members are disposed, the spool control unit including the circuit board is covered with the first synthetic resin coating film. In addition, because regions of the circuit board in which head portions of screw members are disposed are not covered with the first synthetic resin coating film, the head portions will not contact the first synthetic resin coating film when the screw members are screwed in. Because of this, the first synthetic resin coating film will not delaminate even when the screw members are screwed in, thus making it difficult for bad insulation due to delamination to occur.

The braking device for a dual bearing reel according to the eighteenth aspect of the present invention is the device disclosed in any of the ninth through sixteenth aspects, in which the circuit board is mounted to the reel unit with a plurality of screw members having head portions, and a thickness of the first synthetic resin coating film formed on portions of the spool control unit on which head portions of the screw members are disposed is thinner than a thickness of the first synthetic resin coating film formed on other portions of the spool control unit. Here, the insulation performance can be maintained at a high level because the regions on which the head portions of the screw members are disposed are covered with the thin second synthetic resin coating film, and the spool control unit including the circuit board is coated with the thick first synthetic resin coating film. In addition, because the regions on which the head portions of the screws are disposed are covered with the thin second synthetic resin coating film, the border between the thin and the thick second synthetic resin coating film will stop delamination. Thus, it will be difficult for bad insulation due to delamination to occur, even if the second synthetic resin coating film is damaged and delaminates when the screw members are screwed in.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Configuration of the Reel

Figure 1:
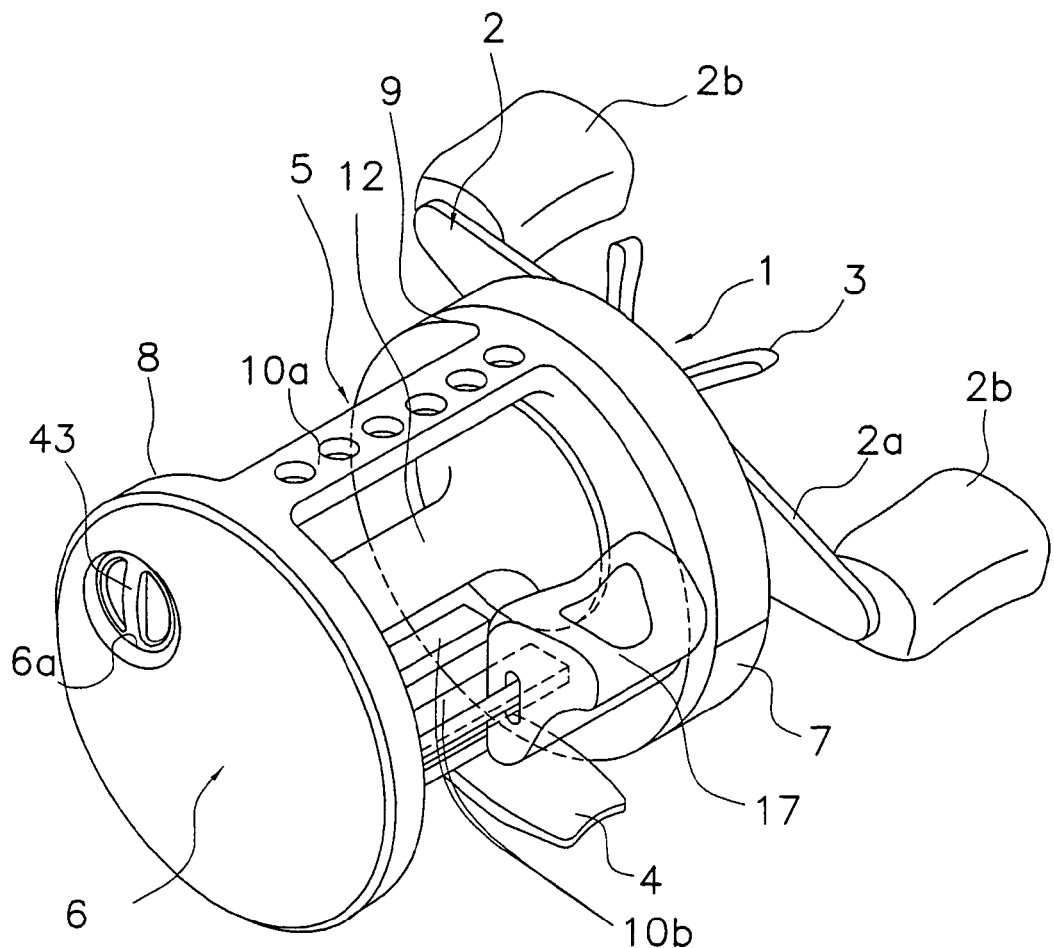
FIG. 1 is a perspective view of a dual-bearing reel in accordance with a first embodiment of the present invention.
Figure 2:
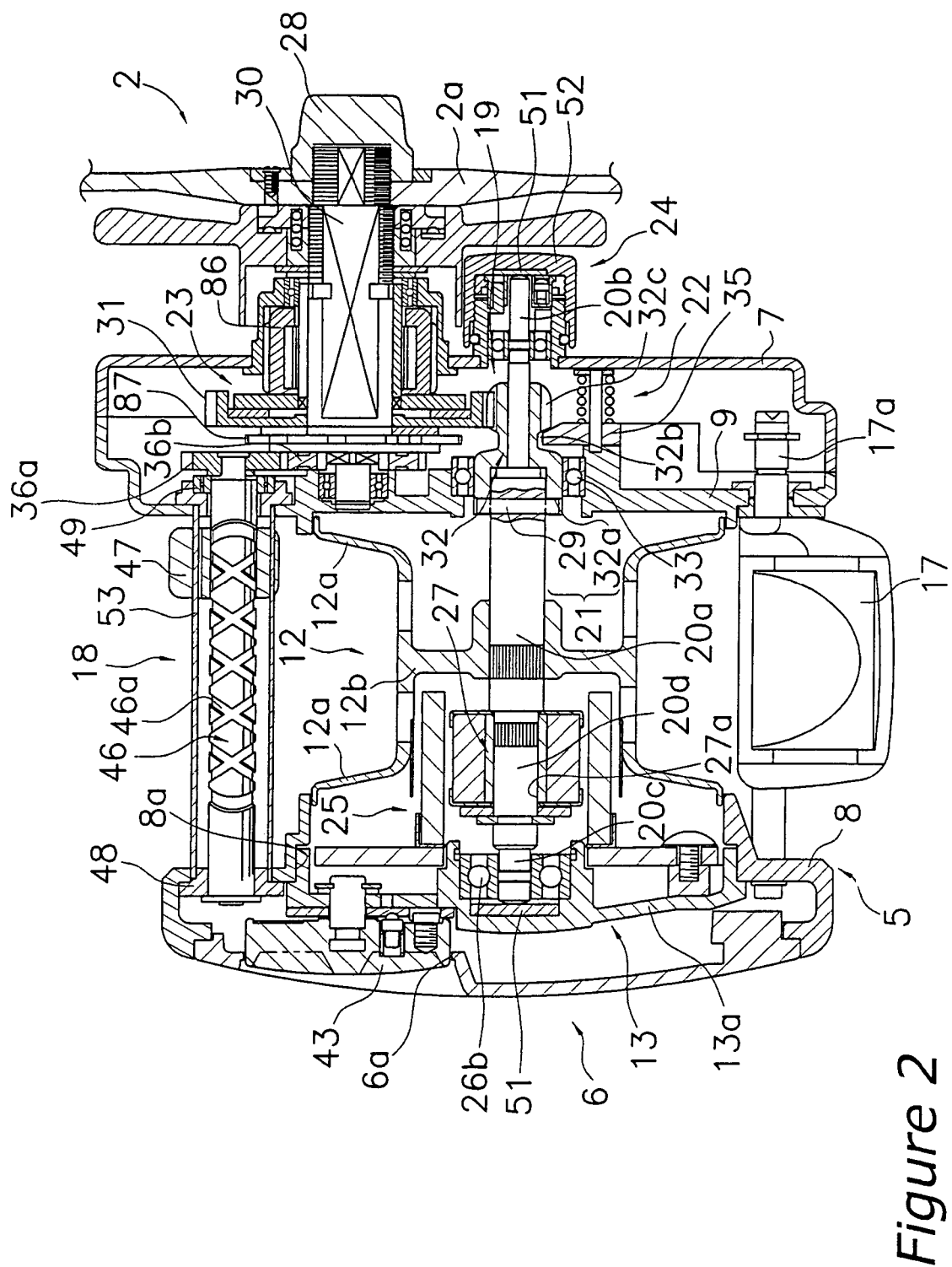
FIG. 2 is a cross sectional view of the dual-bearing reel in accordance with the first embodiment of the present invention.

In FIG. 1 and FIG. 2, a dual bearing reel according to one embodiment of the present invention is a round dual bearing reel for bait casting. This reel includes a reel unit 1, a handle 2 for rotating the spool that is disposed on the side of the reel unit 1, and a star drag 3 for adjusting drag that is disposed on the same side of the reel unit 1 as the handle 2.

The handle 2 is of the double-handle type and has a plate-shaped arm portion 2a and knobs 2b that are rotatively mounted to both ends of the arm portion 2a. As shown in FIG. 2, the arm portion 2a is non-rotatively mounted to the end of a handle shaft 30, and is fastened to the handle shaft 30 by a nut 28.

The reel unit 1 is, for example, made of a metal such as an aluminum alloy or a magnesium alloy, and includes a frame 5, and a first side cover 6 and a second side cover 7 that are mounted to both sides of the frame 5. A spool 12 for winding fishing line is rotatively mounted on a spool shaft 20 (see FIG. 2) inside the reel unit 1. When viewed from the exterior in the spool shaft direction, the first side cover 6 is circular in shape, and the second side cover 7 is formed with two disks that intersect each other.

As shown in FIG. 2, the spool 12, a clutch lever 17 and a level wind mechanism 18 are disposed inside the frame 5. The clutch lever 17 functions as a thumb rest when thumbing the fishing line, and the level wind mechanism 18 serves to uniformly wind fishing line around the spool 12. A gear mechanism 19, a clutch mechanism 21, a clutch control mechanism 22, a drag mechanism 23, and a casting control mechanism 24 are disposed in the space between the frame 5 and the second side cover 7. The gear mechanism 19 transmits rotational force from the handle 2 to the spool 12 and the level wind mechanism 18. The clutch control mechanism 22 controls the clutch mechanism 21 in accordance with the operation of the clutch lever 17. The drag mechanism 23 brakes the spool 12. The casting control mechanism 24 serves to adjust the resistance that occurs when the spool 12 rotates. In addition, an electrically controlled brake mechanism (an example of the braking device) 25 that serves to prevent backlash when casting the fishing line is disposed between the frame 5 and the first side cover 6.

The frame 5 includes a pair of side plates 8, 9 disposed such that they are disposed opposite each other across a predetermined gap, and upper and lower connectors 10a, 10b (see FIG. 1) that unitarily connect the side plates 8, 9. A circular opening 8a is formed slightly above the center of the side plate 8. A spool support portion 13 that forms a portion of the reel unit 1 is screwed into the opening 8a.

Figure 3:
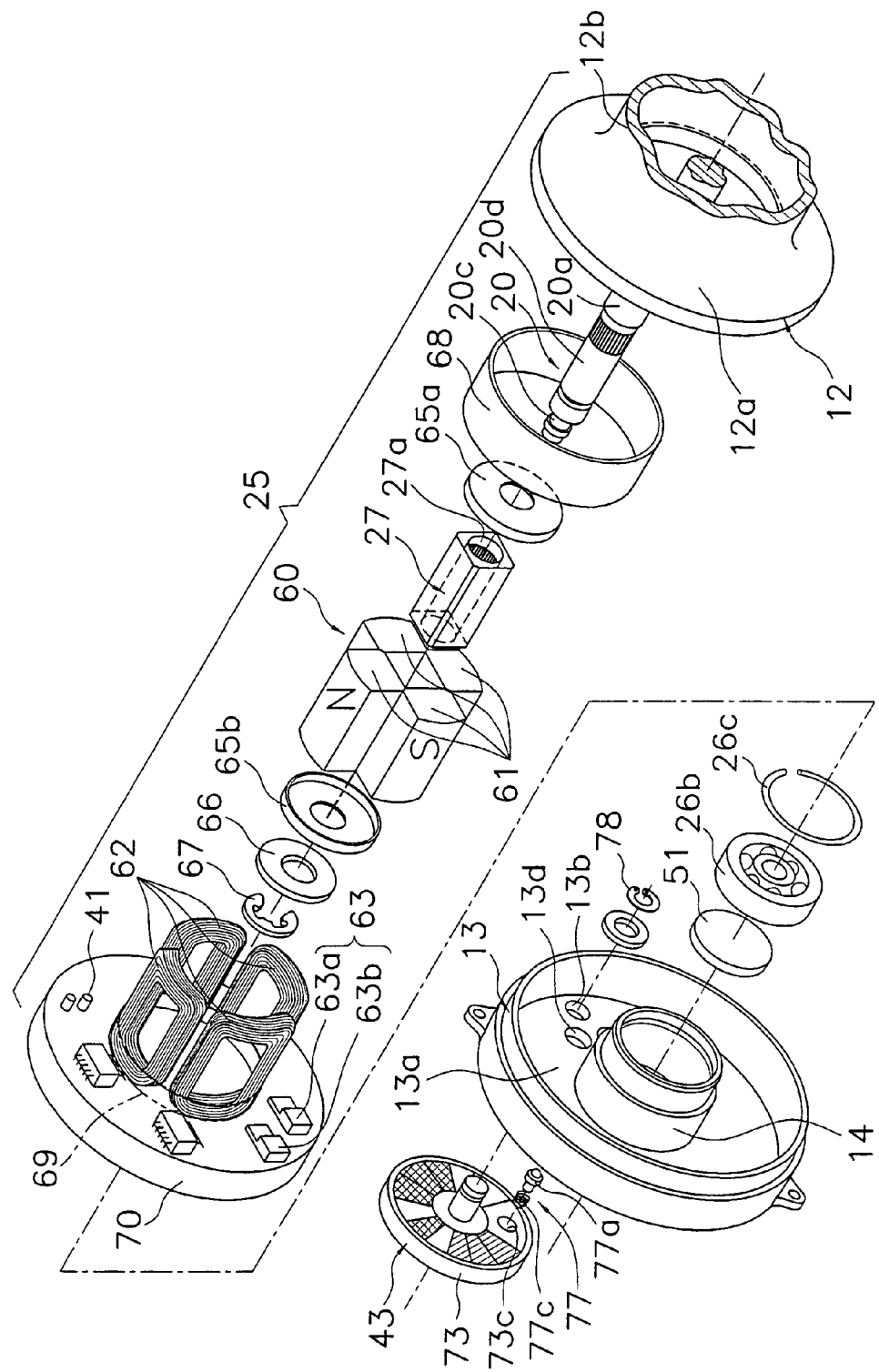
FIG. 3 is an exploded perspective view of a spool brake mechanism in accordance with the first embodiment of the present invention.
Figure 4:
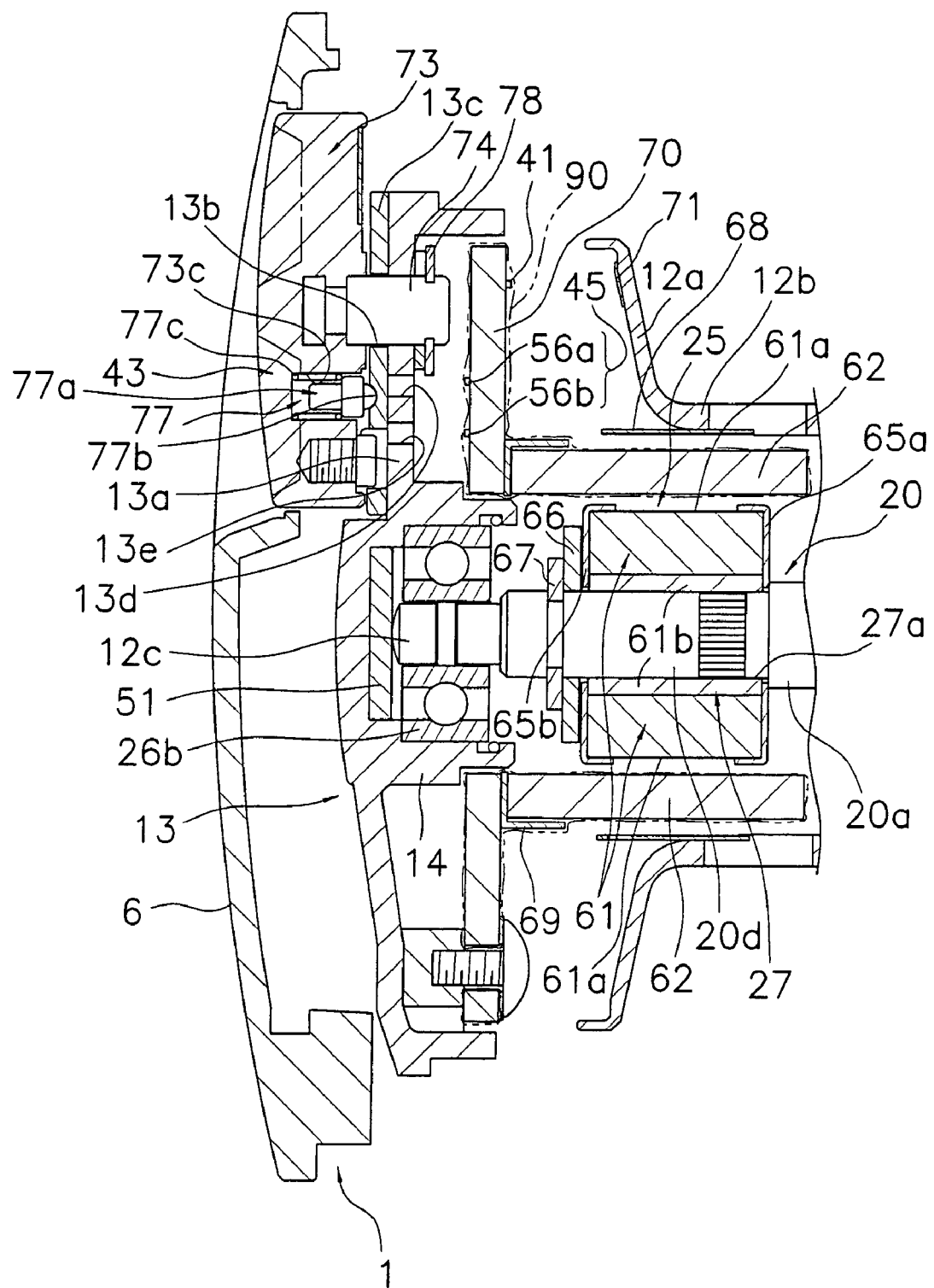
FIG. 4 is a magnified cross-sectional view of the spool brake mechanism in accordance with the first embodiment of the present invention.

As shown in FIGS. 3 and 4, the spool support portion 13 is a flat and approximately closed end tubular portion that is detachably mounted in the opening 8a. A tubular bearing accommodation portion 14 that projects inward is unitarily formed in the central portion of a wall portion 13a of the spool support portion 13. A bearing 26b that serves to rotatively support one end of the spool shaft 20 is disposed on the inner peripheral surface of the bearing accommodation portion 14. In addition, a friction plate 51 of the casting control mechanism 24 is mounted on the bottom of the bearing accommodation portion 14. The bearing 26b is engaged with the bearing accommodation portion 14 by means of a retaining ring 26c that is made of a wire material.

As shown in FIG. 1, the upper connecting portion 10a is mounted in the same plane as the perimeter of the side plates 8, 9, and a pair of front and rear lower connecting portions 10b are disposed inwardly from the perimeter. A rod mounting leg 4 that is, for example, made of a metal such as an aluminum alloy and extends from front to rear is riveted to the lower connecting portions 10b, and serves to mount the reel to a fishing rod.

The first side cover 6 is screwed to the side plate 8 by means of screw members (not shown in the figures) that are inserted from the second side cover 7 side. A circular opening 6a in which a brake switch knob 43 (described below) is disposed is formed in the first side cover 6.

As shown in FIG. 2, the spool 12 has saucer-shaped flange portions 12a on both end portions thereof and a tubular bobbin 12b between the two flange portions 12a. The outer peripheral surface of the flange portion 12a on the left side of FIG. 2 is disposed so that a slight gap is open on the inner peripheral side of the opening 8a, which serves to prevent line snags. The spool 12 is non-rotatably fixed to the spool shaft 20 that passes through the inner peripheral side of bobbin 12b by means of, for example, a serrated coupling. The method of attachment is not limited to serration coupling, and other coupling methods such as key coupling or spline coupling can be employed as well.

The spool shaft 20 is made of a non-magnetic metal such as, for example, SUS 304, and passes through the side plate 9 and extends beyond the second side cover 7. The end of the spool shaft 20 that extends beyond the second side cover 7 is rotatively supported on a boss 7b mounted on the second side cover 7 by means of a bearing 26a. In addition, the other end of the spool shaft 20 is rotatively supported by means of the bearing 26b as described above. A large diameter portion 20a is formed in the center of the spool shaft 20, and small diameter portions 20b, 20c that are supported by the bearings 26a, 26b are formed on both ends of the spool shaft 20. Note that the bearings 26a, 26b are, for example made of SUS 440 that has been coated with a corrosion resistant film.

Furthermore, a magnet mounting portion 20d that serves to mount a magnet 61 (described below) is formed between the small diameter portion 20c and the large diameter portion 20a on the left side of FIG. 1, and has an outer diameter that is larger than the small diameter portion 20c and smaller than the large diameter portion 20a. A magnet retaining portion 27 is non-rotatably fixed to the magnet mounting portion 20d by means of serration coupling, for example, and is a magnetic material formed by electroless plating nickel onto the surface of an iron material such as SUM (extruded and cut). The magnet retaining portion 27 is a rectangular member having a through hole 27a formed therein and is square shaped in cross-section, and the magnet mounting member 20d passes through the center of the magnetic retaining portion 27. The method of attaching the magnet retaining member is not limited to serration coupling, and other coupling methods such as key coupling or spline coupling can be employed as well.

The right end of the large diameter portion 20a of the spool shaft 20 is disposed at a pass through portion of the side plate 9, and an engagement pin 29 that forms a part of the clutch mechanism 21 is fixed at this location. The engagement pin 29 passes through the large diameter portion 20a along its diameter and projects outward from both sides in the radial direction.

As shown in FIG. 2, the clutch lever 17 is disposed to the rear of the spool 12 and between the rear portions of the pair of side plates 8, 9. The clutch lever 17 slides vertically between the side plates 8, 9. An engagement shaft 17a is unitarily formed with the clutch lever 17 on the side of the clutch lever 17 where the handle is mounted, and passes through the side plate 9. The engagement shaft 17a is engaged with the clutch control mechanism 22.

As shown in FIG. 2, the level wind mechanism 18 is disposed between the two side plates 8, 9 in front of the spool 12. The level wind mechanism 18 includes a threaded shaft 46 on whose outer peripheral surface are formed intersecting helical grooves 46a, and a fishing line guide portion 47 which reciprocally moves back and forth on the threaded shaft 46 in the spool shaft direction. The two ends of the threaded shaft 46 are rotatively supported by shaft support portions 48, 49 mounted on the side plates 8, 9. A gear member 36a is mounted on the right end of the threaded shaft 46 in FIG. 2, and the gear member 63a meshes with a gear member 63b that is non-rotatively mounted on the handle shaft 30. With this configuration, the threaded shaft 46 rotates in association with the rotation of the handle shaft 30 in the line winding direction.

The fishing line guide portion 47 is disposed around the periphery of threaded shaft 46, and is guided in the spool shaft 20 direction by means of a pipe member 53 and a guide shaft (not shown in the figures). A portion of the pipe member 53 is cut away over its entire axial length, and the guide shaft is disposed above the threaded shaft 46. An engagement member (not shown in the figures) which engages with the helical grooves 46a is rotatively mounted on the fishing line guide portion 47 and reciprocally moves back and forth in the spool shaft direction by means of the rotation of the spool shaft 46.

The gear mechanism 19 includes a handle shaft 30, a main gear 31 fixed to the handle shaft 30, and a tubular pinion gear 32 that meshes with the main gear 31. The handle shaft 30 is rotatively mounted on the side plate 9 and the second side cover 7, and prohibited from rotating in the line releasing direction by means of a roller-type one-way clutch 86 and a ratchet-type one way clutch 87. The one touch clutch 86 is mounted between the second side cover 7 and the handle shaft 30. The main gear 31 is rotatively mounted on the handle shaft 30, and is coupled to the handle shaft 30 via the drag mechanism 23.

The pinion gear 32 extends from outside of the side plate 9 to the inside thereof, is a tubular member through which the spool shaft 20 passes, and is mounted on the spool shaft 20 so that it is moveable in the axial direction. In addition, the left side of the pinion gear 32 in FIG. 2 is rotatively and movably supported in the axial direction on the side plate 9 by means of a bearing 33 on the side plate 9. A meshing groove 32a that meshes with the engagement pin 20b is formed in the left end of the pinion gear 32 in FIG. 2. The meshing groove 32a and the engagement pin 29 form the clutch mechanism 21. In addition, a constricted portion 32b is formed in the central portion of the pinion gear 32, and a gear portion 32c that meshes with the main gear 31 is formed on the right end of the pinion gear 32.

The clutch control mechanism 22 includes a clutch yoke 35 that moves in the spool shaft 20 direction. In addition, the clutch control mechanism 22 also includes a clutch return mechanism (not shown in the figures) which turns the clutch mechanism 21 on when the spool 12 rotates in the line winding direction.

The casting control mechanism 24 includes a plurality of friction plates 51 and a braking cap 52. The friction plates 51 are disposed on both ends of the spool shaft 20. The braking cap 52 serves to adjust the force with which the friction plates 51 are pressed against the spool shaft 20. The left friction plate 51 is mounted inside the spool support portion 13.

Configuration of the Spool Brake Mechanism

Figure 7:
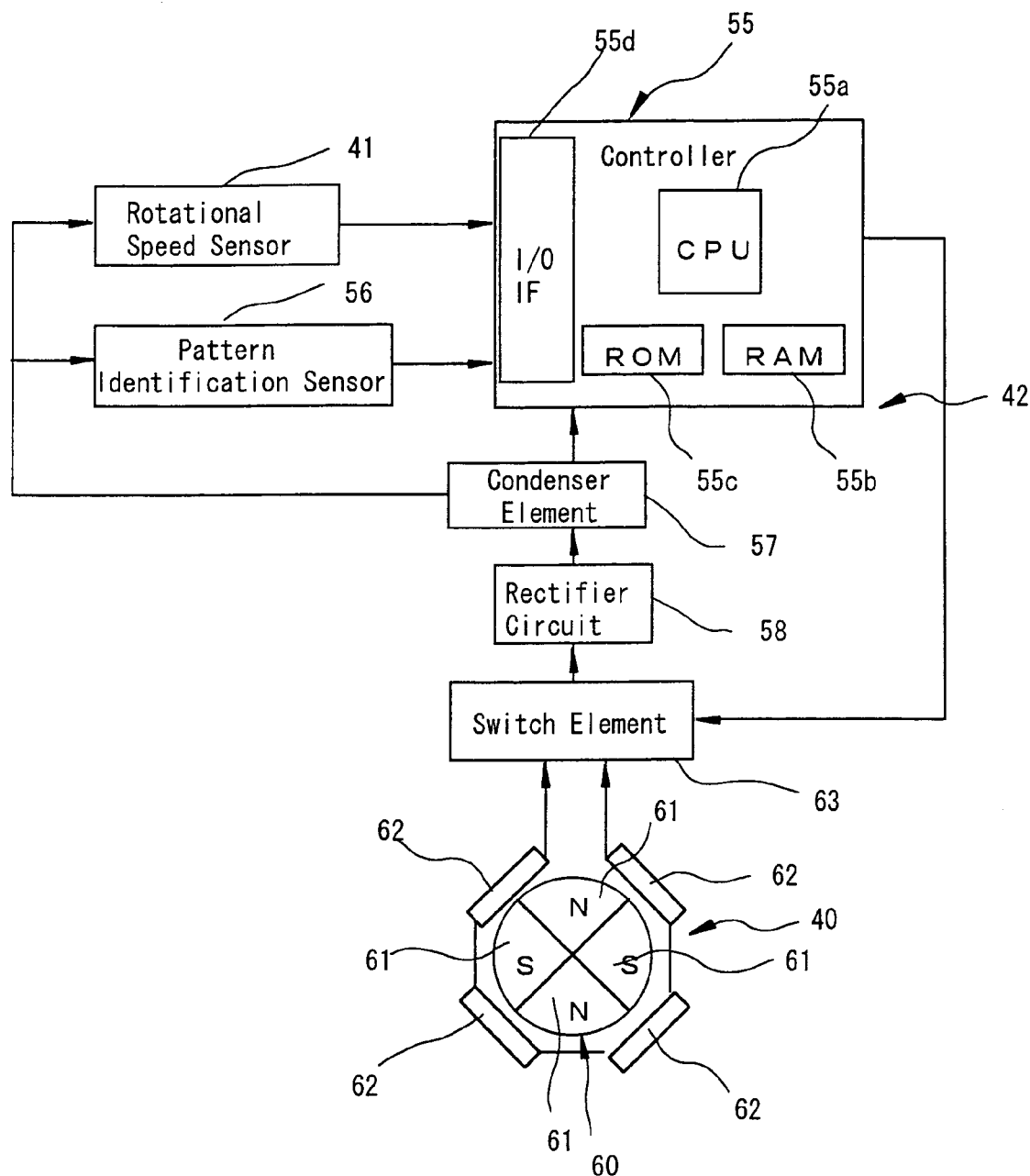
FIG. 7 is a control block diagram of the spool brake mechanism in accordance with the first embodiment of the present invention.

As shown in FIGS. 3, 4 and 7, the spool brake mechanism 25 includes a spool brake unit 40, a rotational speed sensor 41, a spool control unit 42, and the brake switch knob 43. The spool brake unit 40 is arranged between the spool 12 and the reel unit 1. The rotational speed sensor 41 serves to detect tension that is applied to the fishing line. The spool control unit 42 electrically controls the spool brake unit 40 with any one of eight braking modes, and the brake switch knob 43 serves to select the eight braking modes.

The spool brake unit 40 is electrically controlled to brake the spool 12 by generating electricity. The spool brake unit 40a is composed of a rotor element 60 that includes four magnets 61 disposed around the spool shaft 20 in the rotational direction, four coils 62 that are disposed opposite the outer peripheral sides of a rotor element 60 and serially connected to each other, and a switch element 63 to which both ends of the plurality of serially connected coils 62 are connected. The spool brake unit 40 controls the spool 12 by turning the flow of electricity, which is generated by the relative rotation between the magnets 61 and the coil 62, on and off with the switch element 63. The magnets 61 have approximately the same length as that of the magnet retaining portion 27. Outer surfaces 61a of the magnets 61 are arc-shaped in cross-section element 63. The braking force generated by the spool brake unit 40 will increase in accordance with the length of time the switch element 63 is on.

The four magnets 61 of the rotor 60 are disposed side by side in the circumferential direction, and the polarities of the magnets 61 are sequentially, and inner surfaces 61b thereof are planar. The inner surfaces 61b are disposed so that they are in contact with the outer peripheral surfaces of the magnet retaining portion 27 of the spool shaft 20. Both ends of the magnets 61 are interposed between disk shaped and plate shaped cap members 65a, 65b that are made of a non-magnetic metal such as, for example, SUS 304, and the cap members 65a, 65b are non-rotatably mounted to the magnet retaining portion 27 with respect to the spool shaft 20. Because the magnets 61 are retained by cap members 65a, 65b that are made from a non-magnetic metal, the assembly of the magnets 61 onto the spool shaft 20 can be made easier without weakening the magnetic force of the magnets 61 and the comparative strength of the magnets 61 after assembly can be increased.

The distance between the left end surface of the magnets 61 in FIG. 4 and the bearing 26b is 2.5 mm or greater. The cap member 65a on the right side of FIG. 4 is interposed between the step between the large diameter portion 20*a* of the spool shaft 20 and the magnet mounting portion 20*d* and the magnet retaining portion 27, which limits the rightward movement of the cap member 65*a*.

A washer member 66 is mounted to the left side of the cap member 65*b* and disposed between the cap member 65*b* and the bearing 26*b*. The washer member 66 is made from a magnetic material formed by electroless nickel plating the surface of an iron material such as SPCC (plate). The washer member 66 is retained by means of, for example, an e-shaped retaining ring 67 that is mounted to the spool shaft 20. The washer member 66 has a thickness between 0.5 mm and 2 mm, and the outer diameter thereof is between 60% and 120% of the outer diameter of the bearing 26*b*. It will be difficult for the bearing 26*b* disposed near the magnets 61 to become magnetized due to the arrangement of the magnetic washer 66. Because of this, it will be difficult for the magnets 61 to have an impact on the ability of the spool 12 to rotate when the spool 12 is freely rotating, even if the magnets 61 are disposed nearby the bearing 26*b*. In addition, it will also be difficult for the bearing 26*b* to become magnetized because the distance between the magnets 61 and the bearing 26*b* is 2.5 mm or greater.

A sleeve 68 is mounted on the inner peripheral surface of the bobbin 12*b* in a position that faces the magnets 61, and is made from a magnetic material formed by electroless nickel plating the surface of an iron material such as SUM (extruded and cut). The sleeve 68 is fixedly attached to the inner peripheral surface of the bobbin 12*b* by a suitable fixing means such as press fitting or adhesive. When this type of magnetic sleeve 68 is disposed opposite the magnets 61, electrical generation and brake efficiency are increased because magnetic flux from the magnets 61 converge on and pass through the coils 62.

The coils 62 are of the coreless type, which serve to prevent cogging and make the rotation of the spool 12 smooth. Furthermore, a yoke is not provided. The coils 62 are wound into approximate rectangular shapes so that the wrapped core wires face the magnets 61 and are disposed inside the magnetic fields of the magnets 61. The four coils 62 are serially connected, and both ends thereof are connected to the switch element 63. The coils 62 are curved along the rotational direction of the spool 12 into arc-shapes that are substantially concentric with respect to the spool shaft so that the distance between the outer surfaces 61*a* of the magnets 61 and the coils 62 is approximately uniform. Because of this, the gap between the coils 62 and the magnets 61 during rotation can be uniformly maintained. The four coils 62 are held in place by a disk shaped and plate shaped coil holder 69 that is made of a non-magnetic material such as, for example, SUS 304 or the like. The coil holder 69 is fixedly attached to a circuit board 70 (described below) that forms the spool control unit 42. Note that in FIG. 3, the coil holder 69 is illustrated with dashed lines in order to show the coils 62. Thus, the four coils 62 are easily mounted to the circuit board 70 because the coils 62 are mounted on the non-magnetic coil holder 69, and the magnetic flux from the magnets 61 will not be disturbed because the coil holder 69 is made from a non-magnetic material.

The switch element 63 includes, for example, two parallel connected FET (field effect transistors) 63*a* that can switch on and off at a high speed. The serially connected coils 62 are connected to each drain terminal of the FET 63*a*. The switch element 63 is also mounted to the circuit board 70.

The rotational speed sensor 41 employs, for example, a reflection type electro-optical switch that includes a light portion and a receptor portion, and is disposed on a surface of the circuit board 70 that faces the flange portion 12*a* of the spool 12. A read-out pattern 71 is formed on the outer side surface of the flange portion 12*a* by a suitable method such as printing, applying a sticker, or attaching a reflective plate, and serves to reflect light illuminated from the light portion. Signals from the rotational speed sensor 41 allow the rotational speed to be detected so that tension can be applied to the fishing line. The rotational speed sensor 41 is a conventional component that is well known in the art. Therefore, its structures will not be discussed or illustrated in detail herein.

Figure 5:
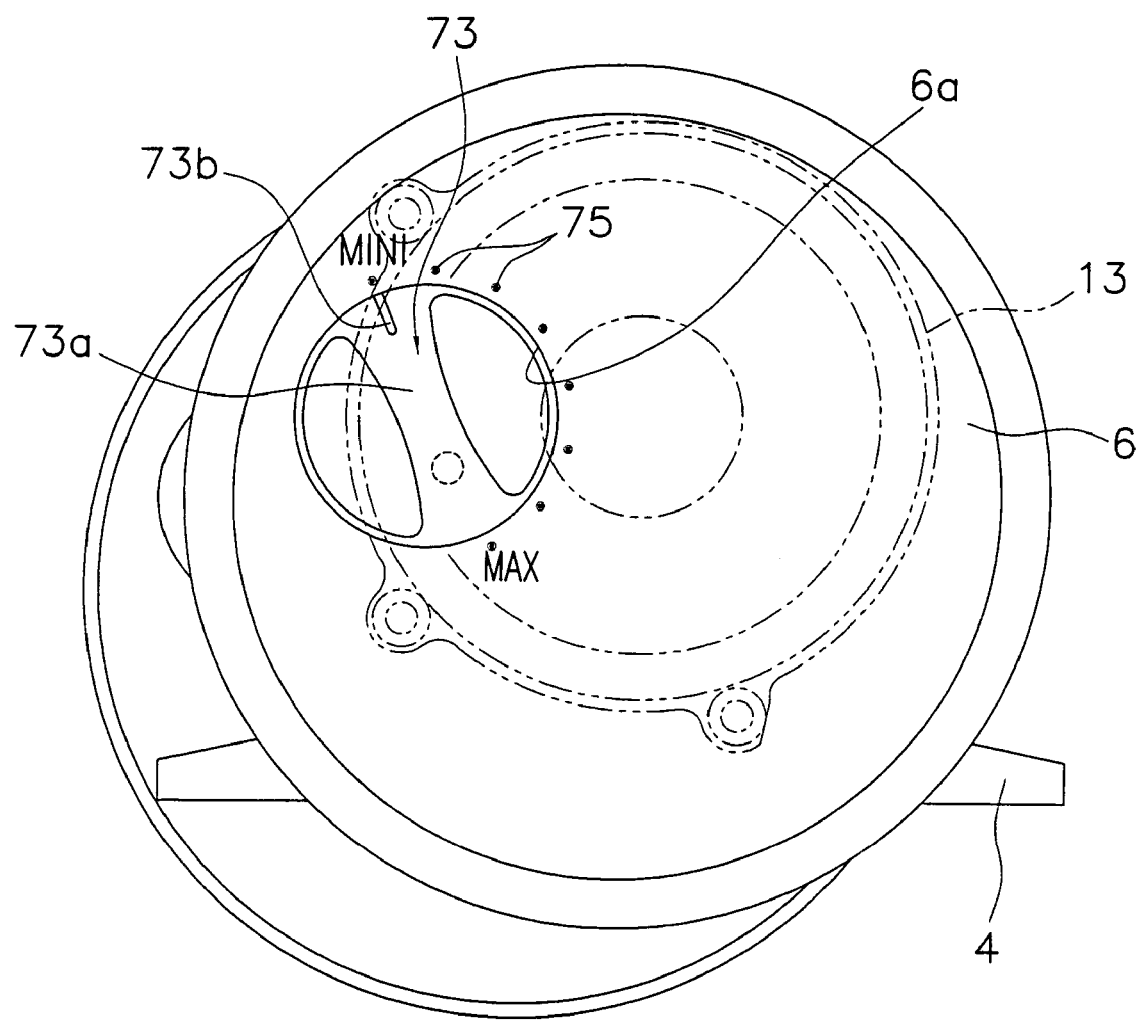
FIG. 5 is a right side view of the dual-bearing reel in accordance with the first embodiment of the present invention.
Figure 6:
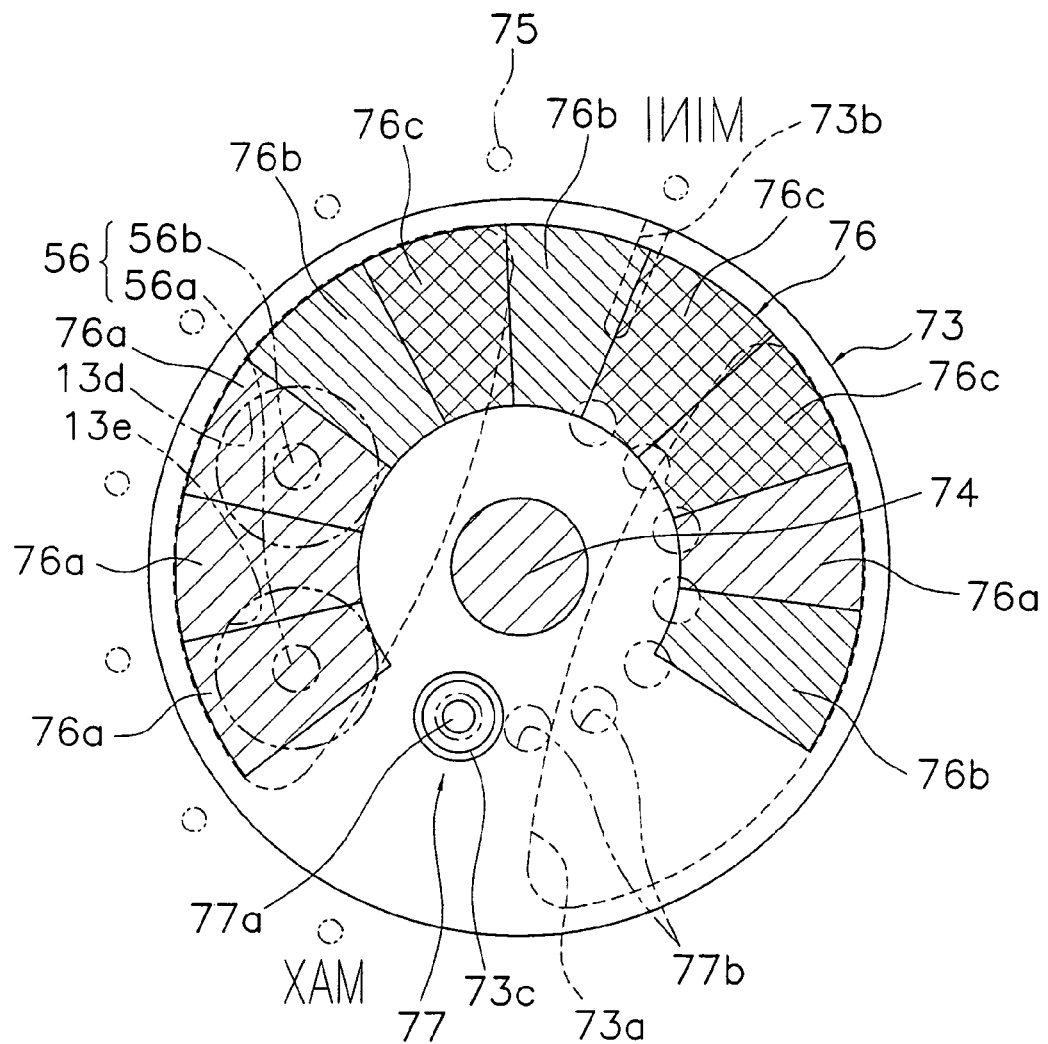
FIG. 6 is a back side view of a brake switch knob in accordance with the first embodiment of the present invention.

The brake switch knob 43 is provided so that the braking mode can be set to any one of 8 levels. As shown in FIGS. 4 to 6, the brake switch knob 42 is rotatively mounted to the spool support portion 13. The brake switch knob 43 includes, for example, a disk-shaped knob unit 73 that is made of a synthetic resin, and a rotation shaft 74 that is made of metal and positioned in the center of the knob unit 73. The rotation shaft 74 and the knob unit 73 are unitarily formed by insert molding. A knob portion 73*a* that extends outward is formed on the outer surface of the knob unit 73 that is exposed in the opening 6*a*. The perimeter of the knob portion 73*a* is concave in shape, which makes the brake switch knob 43 easy to operate.

An indicator 73*b* is formed in one end of the knob portion 73*a* and is slightly concave. Eight marks 75 are formed opposite the indicator 73*b* with a uniform spacing around the perimeter of the opening 6*a* in the first cover 6 by a suitable method such as printing or with a sticker. Any braking mode can be selected and set by rotating the brake switch knob 43 and lining up the indicator 73*b* with one of the marks 75. In addition, an identification pattern 76 is formed with a uniform spacing on the back surface of the knob unit 73 by a suitable method such as printing or with a sticker, and serves to detect the rotational position of the brake switch knob 43, i.e., which of any of the braking modes have been selected. The identification pattern 76 includes three types of ten fan-shaped first to third patterns 76*a*, 76*b*, and 76*c* in the rotational direction. The first pattern 76*a* is illustrated with hatching on the lower left portion of FIG. 6, and is for example a mirrored surface that reflects light. The second pattern 76*b* is illustrated with hatching on the lower right portion of FIG. 6, and is for example a pattern that is black and thus reflects light with difficulty. The third pattern 76*c* is illustrated with cross-hatching in FIG. 6, and is for example a gray pattern that reflects only approximately half of the light. Which of the eight levels of braking mode is selected can be identified by the combination of these three types of patterns 76*a*–76*c*. Note that if one of the patterns 76*a*–76*c* has the same color as the knob unit 73, then the back surface of the knob unit 73 may be used as is and a separate pattern need not be formed thereon.

The rotation shaft 74 is mounted in a through hole 13*b* formed in the wall portion 13*a* of the spool support portion 13, and is engaged with the wall portion 13*a* by a retaining ring 78.

A positioning mechanism 77 is provided between the knob unit 73 and the outer surface of the wall portion 13*a* of the spool support portion 13. The positioning mechanism 77 positions the brake switch knob 43 at a positions indicating the eight levels that correspond to the braking mode, and generates sounds when the brake switch knob 43 is rotated. The positioning mechanism 77 includes a positioning pin 77*a*, eight positioning holes 77*b*, and an urging member 77*c*. The positioning pin 77*a* is mounted in a recessed portion 73*c* formed in the back surface of the knob unit 73*a*. The positioning holes 77*b* engage with the tip of the positioning pin 77a. The urging member 77c urges the positioning pin 77a toward the positioning holes 77b. The positioning pin 77a is a rod shaped member that includes a small diameter head portion, a brim portion having a diameter that is larger than the head portion, and a small diameter shaft portion. The head portion is formed into a hemispherical shape. The positioning pin 77a is mounted in the recessed portion 73c so that it can both project outward and retract inward. The eight positioning holes 77b are formed in a spaced relationship in a fan-shaped auxiliary member 13c that is fixedly coupled around the periphery of the through hole 13b in the outer surface of the wall portion 13a of the spool support portion 13. The positioning holes 77b are formed so that the indicator 73b will align with one of the eight marks 75.

The spool control unit 42 includes the circuit board 70 that is mounted to the surface of the spool support portion 13 that faces the flange portion 12a of the spool 12, and a controller 55 that is provided on the circuit board 70.

The circuit board 70 is a washer-shaped and ring-shaped substrate having a circular opening in the center thereof, and is disposed on the outer peripheral side of the bearing accommodation portion 14 so as to be substantially concentric with the spool shaft 20. The circuit board 70 is fixedly coupled to the inner side surface of the wall portion 13a of the spool support portion 13 by screws. When the circuit board 70 is to be coupled with screws, then for example a jig that is temporarily positioned on the bearing accommodation portion 14 is used to center the circuit board 70, and the circuit board 70 is then disposed so that it is substantially concentric with respect to the spool shaft 20. In this way, when the circuit board 70 is mounted to the spool support portion 13, the coils 62 that are fixedly attached to the circuit board 70 will be disposed so that they are substantially concentric with the spool shaft axis.

Here, because the circuit board 70 is mounted on a surface of the spool support portion 13 that faces the flange portion 12a of the spool 12, the coils 62 mounted around the periphery of the rotor element 60 can be directly attached to the circuit board 70. Because of this, a lead wire that connects the coils 62 and the circuit board 70 will be unnecessary, and unneeded insulation between the coils 62 and the circuit board 70 can be avoided. Moreover, because the coils 62 are mounted to the circuit board 70 that is attached to the spool shaft portion 13, the coils 62 can be mounted to the spool support portion 13 by only attaching the circuit board 70 to the spool support portion 13. Because of this, the spool brake mechanism 25 can be easily assembled.

The controller 55 is for example composed of a microcomputer provided with a CPU 55a, a RAM 55b, a ROM 55c and an I/O interface 55d. A control program is stored in the ROM 55c of the controller 55, as well as brake patterns that execute three brake processes (described below) in accordance with each of the eight levels of braking mode. In addition, preset values for tension and rotational speed during each braking mode are also stored in the ROM 55c. The rotational speed sensor 41 and a pattern identification sensor 56 for detecting the rotational position of the brake switch knob 43 are operatively connected to the controller 55. In addition, the gates of each FED 63a of the switch element 63 are also operatively connected to the controller 55. The controller 55 is capable of selectively controlling any of the components connected thereto. The controller 55 controls the on/off state of the switch element 63 of the spool brake unit 40 in response to pulse signals from each sensor 41, 56 by PWM (pulse width modulated) signals that have cycles of, for example, $\frac{1}{1000}$ seconds and are generated by the control program (described below). More specifically, the controller 55 controls the on/off state of the switch element 63 in the eight levels of braking mode with different duty ratios D. Electric power is supplied to the controller 55 from a condenser element 57. This electric power is also supplied to the rotational speed sensor 41 and the pattern identification sensor 56.

It will be apparent to those skilled in the art from this disclosure that the precise structure and algorithms for controller 55 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The pattern identification sensor 56 is provided in order to read out the three types of patterns 76a–76c of the identification pattern 76 formed on the back surface of the knob unit 73 of the brake switch knob 43. The pattern identification sensor 56 is composed of two electro-optical sensors 56a, 56b each having a light and a receptor. The electro-optical sensors 56a, 56b are disposed such that they are vertically aligned on a side of the circuit board 70 that faces the wall portion 13a of the spool support portion 13. Viewing holes 13d, 13e are formed in the wall portion 13a of the spool support portion 13 such that they are vertically aligned, and allow the electro-optical sensors 56a, 56b to acquire each pattern 76a–76c. Here, the eight levels of braking mode can be identified as will be described below by reading out the three types of patterns 76a–76c disposed such that they are aligned in the rotational direction.

As shown in FIG. 6, when the indicator 73b is in the weakest position, the pattern identification sensor 56 will read out reflected light from two of the first patterns 76a. In this state, both electro-optical sensors 56a, 56b will detect the largest amount of light. Then, if the indicator 73b is aligned with the next mark, the electro-optical sensor 56b on the lower side will be positioned on the first pattern 76a and detect a strong amount of light, but the electro-optical sensor 56a on the upper side will be positioned on the second pattern 76b and detect almost no light. The position of the brake switch knob 43 will be identified by combining these detected light amounts.

The condenser element 57 employs, for example, an electrolytic condenser, and is connected to a rectifier circuit 58. The rectifier circuit 58 is connected to the switch element 63, and both converts alternating current from the spool brake unit 40 to direct current (the spool brake unit 40 having the rotor element 60 and coils 62 and functions as an electric generator) and stabilizes the voltage to supply it to the condenser element 57.

Note that the rectifier circuit 58 and the condenser element 57 are both provided on the circuit board 70. Each unit (including the coils 62) that is provided on the circuit board 70 is covered by an insulating coating film 90 (an example of first synthetic coating film) made of a transparent synthetic resin insulating material. More specifically, when each unit is mounted on the circuit board 70 and the wiring is completed, the circuit board 70 is immersed in a tank containing a liquid synthetic resin, and after this the circuit board 70 is removed from the tank and the synthetic resin thereon is hardened to form the insulating coating film 90 on the surface of the circuit board 70. By covering each unit on the circuit board 70 in this manner with an insulating coating film 90 made of an insulating material, liquids can be prevented from entering the electrical components such as the controller 55. Moreover, in this embodiment, it will be unnecessary to replace the electric power source because the electrical power that is generated will be stored in the condenser element 57 and this electrical power will be used to operate the controller 55 and the like. Because of this, the sealing of the insulating coating film 90 can be made permanent, and trouble caused by unneeded insulation can be reduced.

Operation and Function of the Reel During Actual Fishing

When casting, the clutch lever 17 is pressed down to place the clutch mechanism 21 in the clutch off position. In this clutch off state, the spool 12 can rotate freely, and the fishing line will unwind from the spool 12 at full speed when casting due to the weight of the tackle. When the spool 12 rotates due to casting, the magnets 61 rotate around the inner peripheral sides of the coils 62, and if the switch element 63 is on, an electric current will flow through the coils 62 and the spool 12 will be braked. During casting, the rotational speed of the spool 12 will gradually become faster, and will be gradually reduced if a peak is exceeded.

Here, even if the magnets 61 are disposed near the bearing 26b, it will be difficult for the bearing 26b to become magnetized and the ability of the spool 12 to freely rotate will improve because the magnetic washer member 66 is disposed between the magnets 61 and the bearing 26b and because there is a gap of 2.5 mm or greater between the magnets 61 and the bearing 26b. In addition, it will be difficult for cogging to be produced and the ability of the spool 12 to freely rotate will improve because the coils 62 are coreless coils.

When the tackle lands in the water, the clutch mechanism 21 will be placed in the clutch on state by rotating the handle 2 in the line winding direction and by a clutch return mechanism (not shown in the figures), and the reel unit 1 will be palmed to await a bite from a fish.

Control Operation of the Controller

Figure 8:
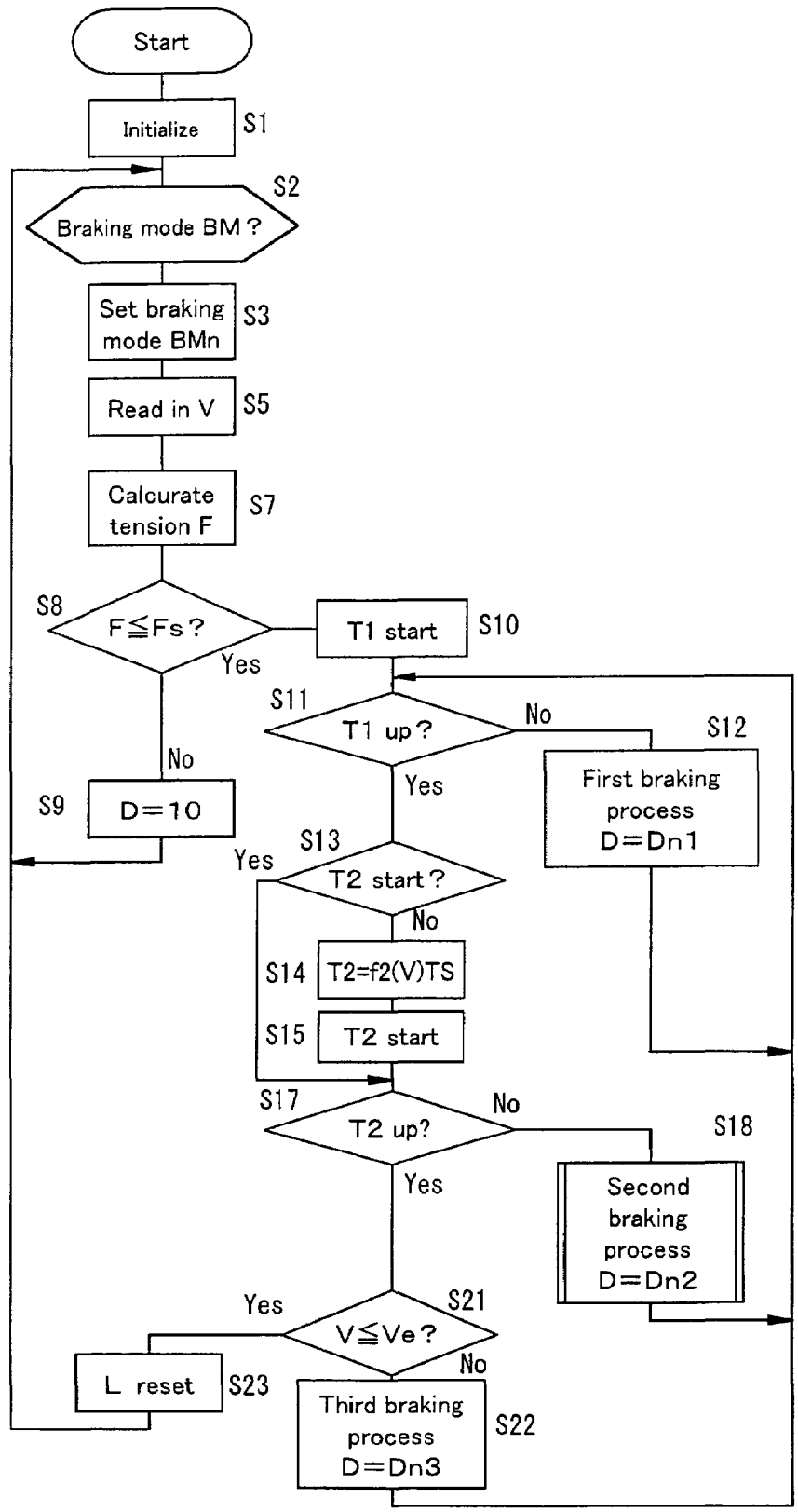
FIG. 8 is a flowchart showing the primary control processes of a controller in accordance with the first embodiment of the present invention.

Next, the brake control operation performed by the controller 55 during casting will be described with reference to the control flowcharts of FIGS. 8 and 9 and the graphs in FIGS. 10 and 11.

Initialization occurs at Step S1 when the spool 12 rotates due to casting, electric power is stored in the condenser element 57, and an electric power supply flows into the controller 55. Here, various flags and variables are reset. In Step S2, it is determined whether or not a braking mode BMn has been selected by the brake switch knob 43 (n is an integer between 1 and 8). At Step S3, the braking mode that was selected is set as braking mode BMn. When this occurs, a duty ratio D that corresponds to the braking mode BMn will be read out from the ROM inside the controller 55. At Step S5, a rotational speed V of the spool 12 when casting begins is detected based on pulses from the rotational speed sensor 41. At Step S7, tension F applied to the fishing line released from the spool 12 is computed.

Here, the tension F can be determined from the rate of change of the rotational speed of the spool 12 ($\Delta\omega/\Delta t$) and the moment of inertia J of the spool 12. When the rotational speed V of the spool 12 changes at a certain point, the difference between this rotational speed and the rotational speed of the spool 12 when it freely and independently rotates without receiving tension from the fishing line is due to rotational drive force (torque) generated by the tension from the fishing line. If we assume that the rate of change of the rotational speed at this time is ($\Delta\omega/\Delta t$), then the drive torque T can be expressed as equation (1) below.

$$T = J \times (\Delta\omega/\Delta t) \quad (1)$$

If the drive torque T is determined from equation (1), the tension from the radius of the point of application of the fishing line (normally 15 to 20 mm) can be determined. The present inventors discovered that if a large braking force is applied when this tension is at or below a predetermined value, the attitude of the tackle (lure) will reverse and stabilize just before the peak rotational speed of the spool 12 and the tackle will fly. The following control is carried out in order to brake the spool 12 just before its peak rotational speed and make the tackle fly with a stable attitude. In other words, a strong braking force will be applied to the spool 12 for a short period of time at the beginning of casting to make the tackle reverse, and after this the spool 12 will be braked with a braking force that gradually weakens to a constant amount during casting. Finally, the spool 12 will be braked with a braking force that gradually weakens until the number of rotations of the spool 12 falls below a predetermined value. The controller 55 will carry out these three braking processes.

In Step S8, it is determined whether or not the tension F computed based on the rate of change of the rotational speed ($\Delta\omega/\Delta t$) and the moment of inertia J is at or below a predetermined value Fs (for example, a value in a range between 0.5N and 1.5N). If the tension F exceeds the predetermined value Fs, then the process moves to Step S9, where the duty ratio D is set to 10 (i.e., the switch element 63 is turned on for only 10% of a cycle). The process then returns to Step S2. When this occurs, the spool brake unit 40 slightly brakes the spool 12, but the spool control unit 42 will stably operate because the spool brake unit 40 generates electricity.

If the tension F is at or below the predetermined value Fs, then the process moves to Step S10. In Step S10, a timer for a first predetermined duration of time T1 is started. This first predetermined duration of time T1 determines a duration of time during which a first braking process will be applied that brakes the spool 12 with a strong braking force. At Step S11, it will be determined whether or not the first predetermined duration of time T1 has timed out. If the first predetermined duration of time T1 has not timed out, then the process moves to Step S13 and the first braking process is carried out during casting until the first predetermined duration of time T1 times out. As shown by the hatching in the lower left portion of FIG. 10, this first braking process brakes the spool 12 for first predetermined duration of time T1 with a fixed first duty ratio Dn1. This first duty ratio Dn1 is for example 50 to 100% duty (on for 50% to 100% of the entire cycle), and preferably in a range between 70 to 90% duty, and changes depending upon the rotational speed V detected at Step S5. In other words, the first duty ratio Dn1 is a value that is computed by multiplying a function f1(V) of the spool rotational speed V at the beginning of casting with a duty ratio DnS that is predetermined in accordance with the braking mode. In addition, the first predetermined duration of time T1 is preferably in a range between 0.1 to 0.3 seconds. When braking occurs within this time range, it will be easier to brake the spool 12 before it reaches its peak rotational speed.

The first duty ratio Dn1 is shifted up or down depending upon the braking mode BMn. In this embodiment, when the braking mode is at the highest value (n=1), a duty ratio D11 will be the maximum and will gradually decrease from this point. When a strong braking force is applied for the first predetermined duration of time as described above, the attitude of the tackle will reverse from its fishing line engagement portion, the fishing line engagement portion will be in front, and the tackle will fly. When this occurs, the attitude of the tackle will be stable, and thus the tackle will fly further.

On the other hand, when the first predetermined duration of time T1 times out, the process moves from Step S11 to Step S12. At Step S12, it will be determined whether or not a timer for a second predetermined duration of time T2 has already started. If the timer for the second predetermined duration of time T2 has started, then the process moves to Step S17. If the timer for the second predetermined duration of time T2 has not started, then the process moves to Step S13, where the second duration of time T2 is calculated. Like the first duty ratio Dn1, the second predetermined time T2 also changes according to the spool rotational speed V at the beginning of casting. For example, the second predetermined time T2 is calculated by multiplying a function f2(V) of the spool rotational speed V at the beginning of casting with a predetermined time period TS. The second predetermined duration of time T2 determines the length of time that a second braking process will be carried out. The second predetermined time T2 is preferably between 0.3 to 2 seconds. Then, the process proceeds to Step S14. Step S14 and the timer for the second predetermined duration of time T2 is started.

At Step S17, it will be determined whether or not the second predetermined duration of time T2 has timed out. If the second predetermined duration of time T2 has not timed out, then the process moves to Step S18 and the second braking process is carried out until the second predetermined duration of time T2 times out. In Step S18, the second duty ratio Dn2 is calculated as a function of time. As shown by the hatching in the lower right portion of FIG. 10, the second braking process brakes the spool 12 during the second predetermined duration of time T2 at a duty ratio Dn2 that drops rapidly dropping at first, then drops gradually, and finally remains at a constant value. The minimum value of the duty ratio Dn2 is preferably in a range between, for example, 30 and 70%.

Figure 9:
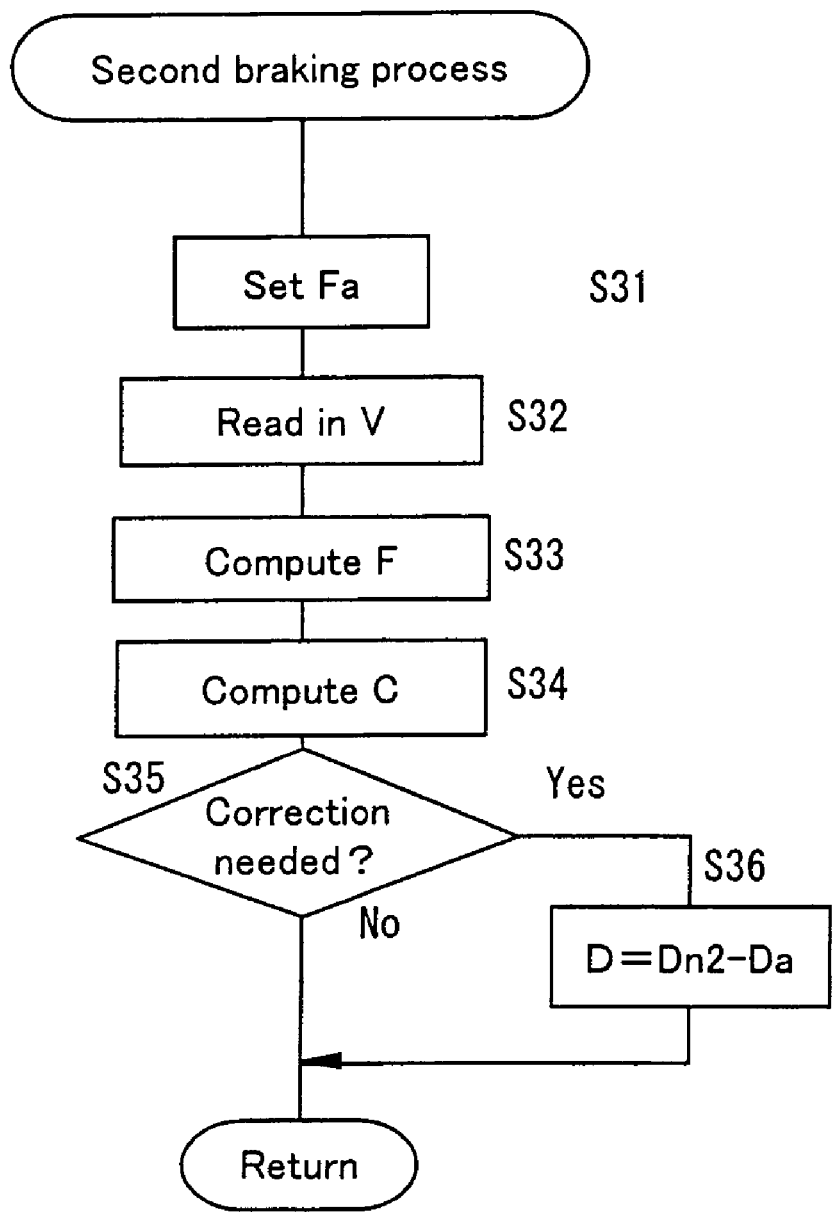
FIG. 9 is a flowchart showing a second control process in accordance with the first embodiment of the present invention.

In addition, a brake correction process like that shown in FIG. 9 is carried out in the second braking process and a third braking process in order to cut extraneous braking force. In Step S31 of FIG. 9, a correction tension Fa is set. The correction tension Fa is a function of time like that shown by the dotted and dashed lines in FIG. 11, and is set such that it gradually declines over time. Note that in FIG. 11, a graph of the correction process in the third braking process is illustrated.

The speed V is read in at Step S32. At Step S33, the tension F is computed in the same sequence as in Step S7. At Step S34, a criterion expressed by the following equation (2) is computed from the tension obtained in Step S33. At Step S35, it is determined whether or not brake correction is needed from the criterion.

$$C = SSa \times (F - SSd \times \text{rotational speed}) - (\Delta F / \Delta t) \quad (2)$$

Here, SSa, SSd are coefficients with respect to the rotational speed (rpm), which is for example 50. In addition, SSd is 0.000005 in this embodiment.

When the results of equation (2) are greater than zero, which means that the computed value of the tension F exceeds the set tension Fa by a large amount, then it is determined in Step S35 that the answer is "Yes", and the process moves to Step S36. At Step S36, the second duty ratio Dn2 that was set in advance is corrected by subtracting a fixed amount Da from the second duty ration Dn2 for the next sampling cycle (normally each revolution). The process then returns to Step S11.

At Step S17, if it is determined that the second predetermined duration of time T2 is up, the process proceeds to Step S21.

At Step S21, it is determined whether or not the speed V is at or below a brake completion speed Ve. If the speed V exceeds the brake completion speed Ve, then the process moves to Step S22. The third braking process is carried out at Step S22.

Figure 10:
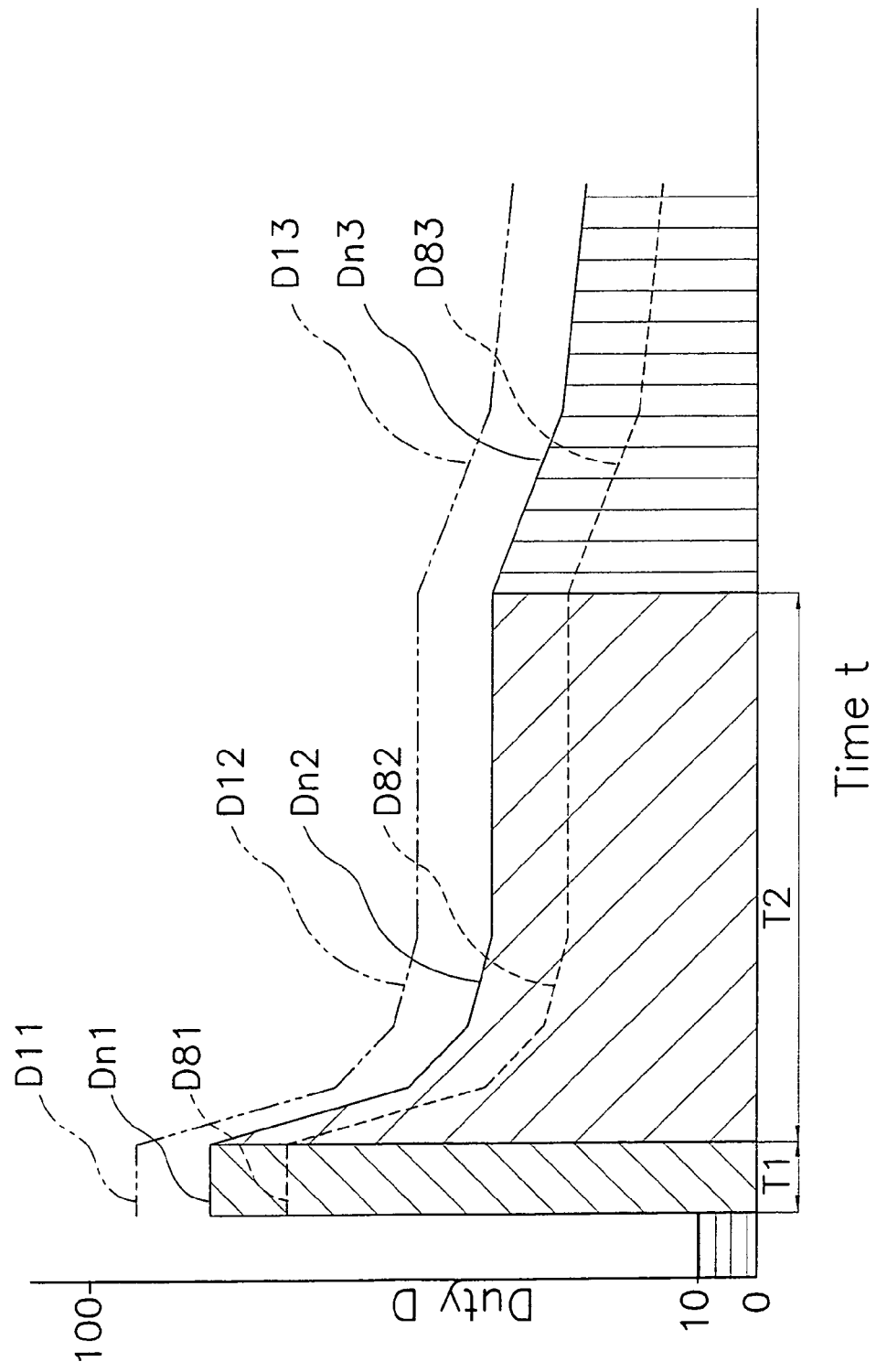
FIG. 10 is a graph that schematically illustrates a change in the duty ratios of each control process.
Figure 11:
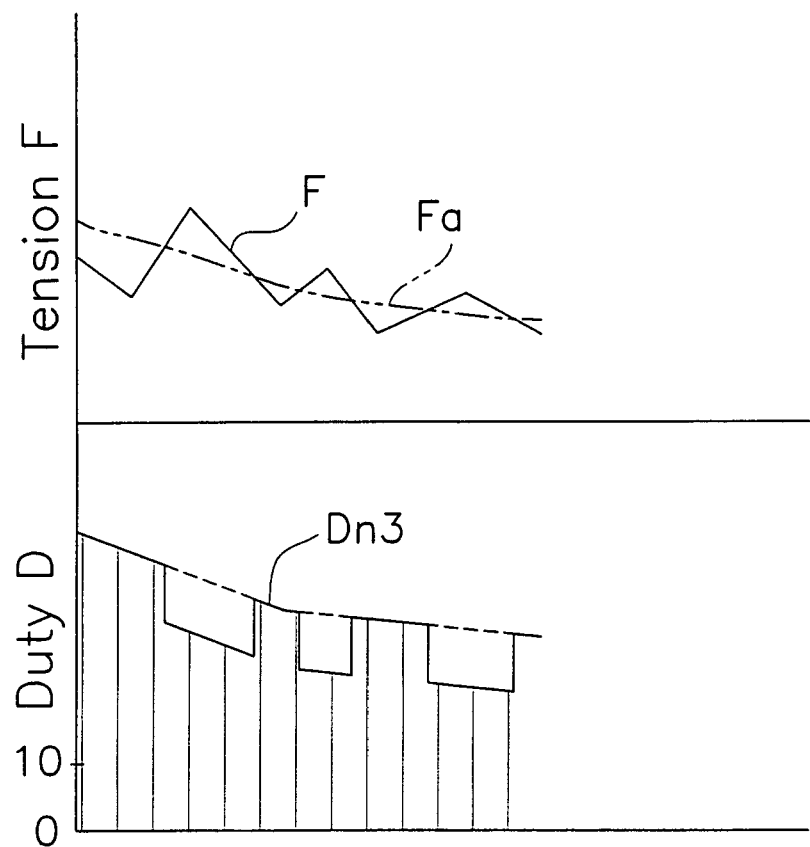
FIG. 11 is a graph which schematically illustrates an auxiliary process of a third control process.
Figure 12:
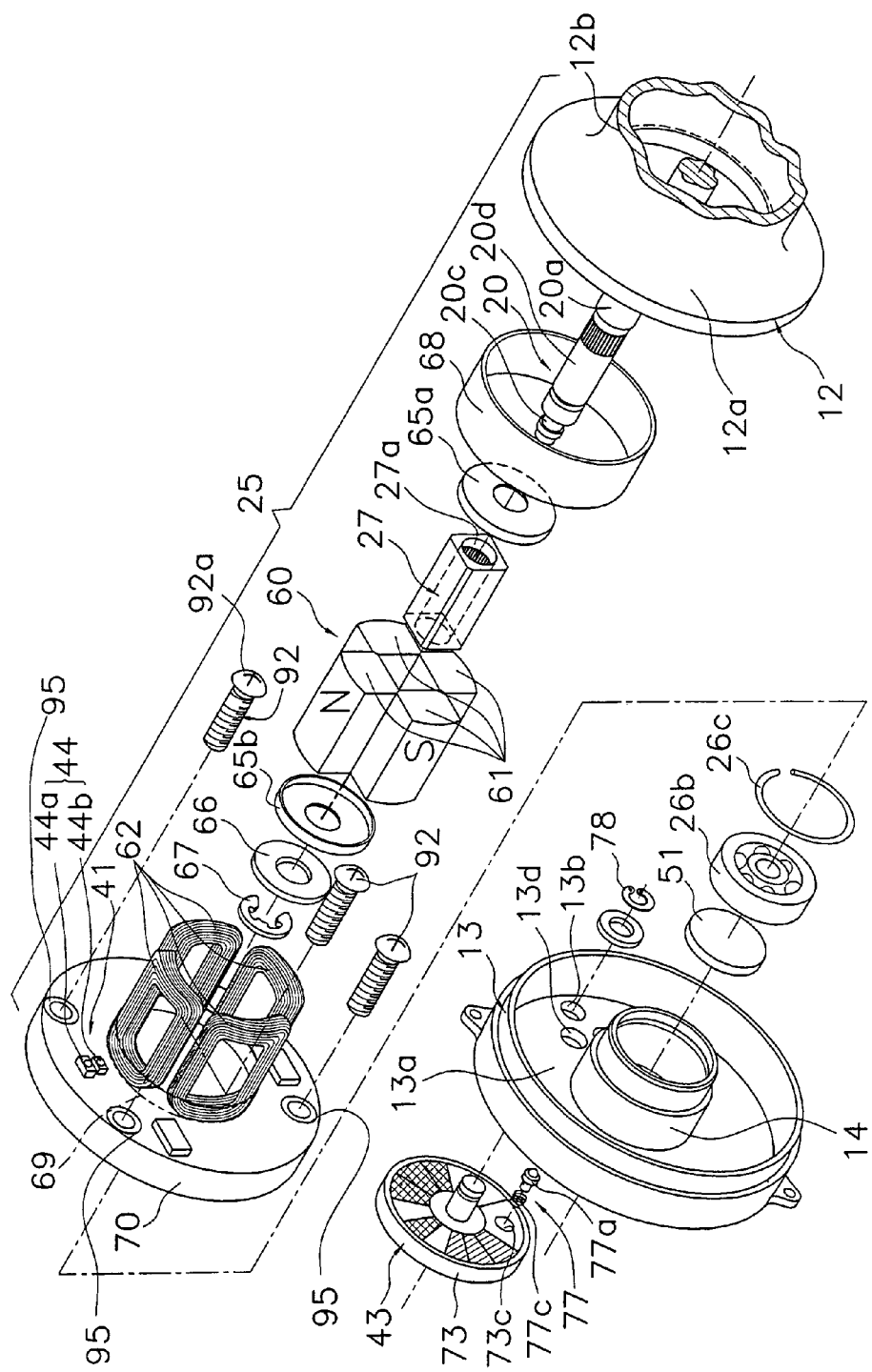
FIG. 12 is an exploded perspective view of a spool brake mechanism in accordance with a second embodiment of the present invention.

As shown by the vertical hatching in FIG. 10, the third braking process brakes the spool 12 with a duty ratio Dn3 that changes over time like the second braking process and in which the rate of decline gradually becomes smaller. In the mean time, the brake correction process explained above is executed in the third braking process. Then, the process returns to Step S11, and at Step S21 the process continues until the speed V is equal to or lower than the brake completion speed Ve.

If the speed V is equal to or below the brake completion speed Ve, then the process returns to Step S2.

Here, if the spool 12 is braked with a strong braking force before the rotational speed of the spool 12 peaks, tension that was at or below the first predetermined value Fs will be rapidly increased. Accordingly, backlash will be prevented, and the tackle will fly in a stable manner. Because of this, backlash can be prevented, the attitude of the tackle can be stabilized, and the tackle can be cast out further.

In addition, because the spool is controlled in three braking processes with different duty ratios and braking times in accordance with the rotational speed of the spool at the beginning of casting, the spool will be braked with duty ratios and braking times that differ depending upon the rotational speed of the spool, even when the settings are the same. Because of this, it will be unnecessary to manually adjust the braking force even if casting is performed with different spool rotational speeds, and thus the burden on the fisherman can be reduced.

Second Embodiment

In the first embodiment, the insulating coating film 90 is formed on the whole surface of the circuit board 70. However, it is possible to form insulating coating selectively. The description below abbreviates the explanation of constitution and operation that are identical or equal with those of the first embodiment.

Figure 13:
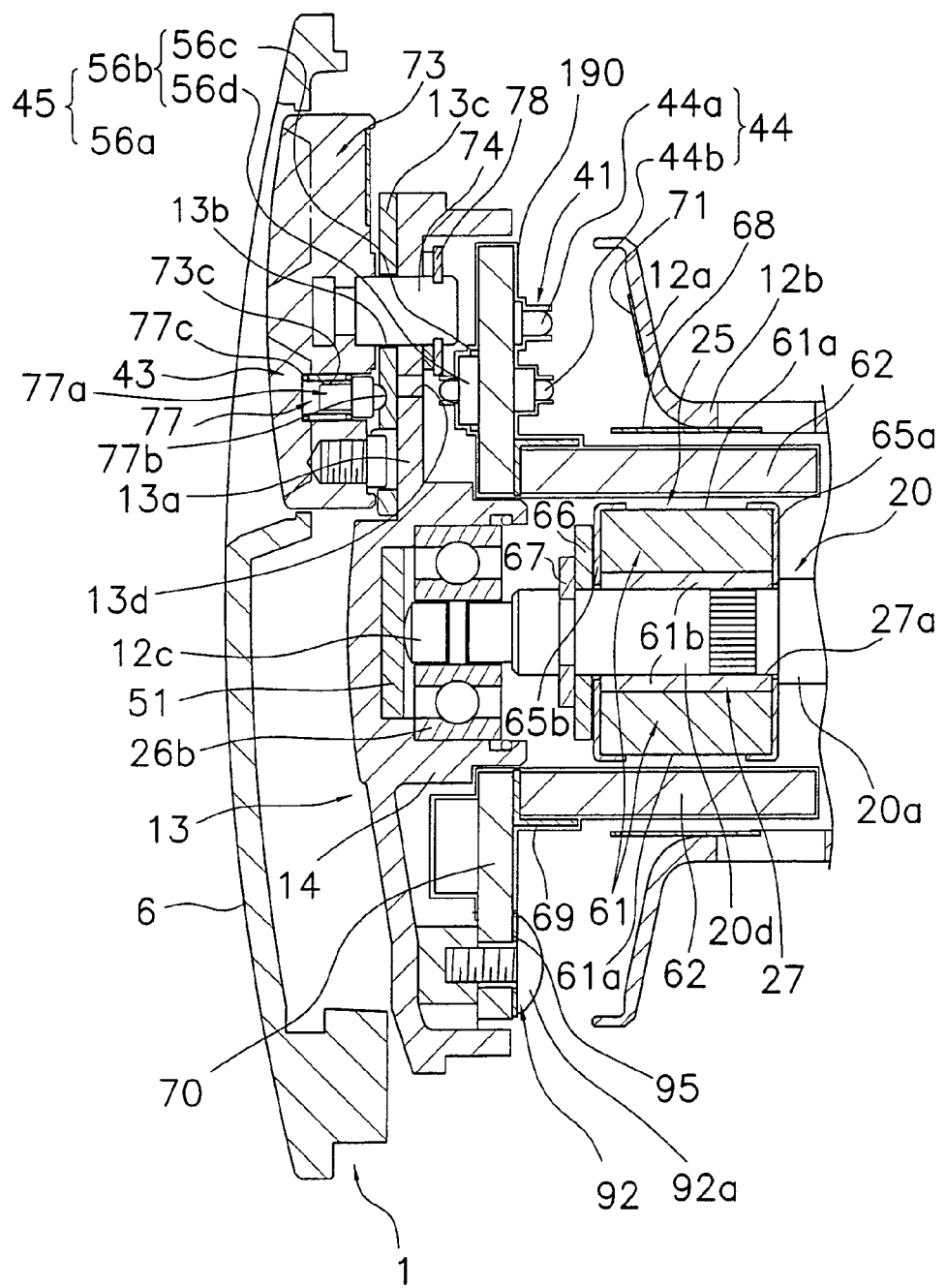
FIG. 13 is a magnified cross-sectional view of the spool brake mechanism in accordance with the second embodiment of the present invention.
Figure 14A:
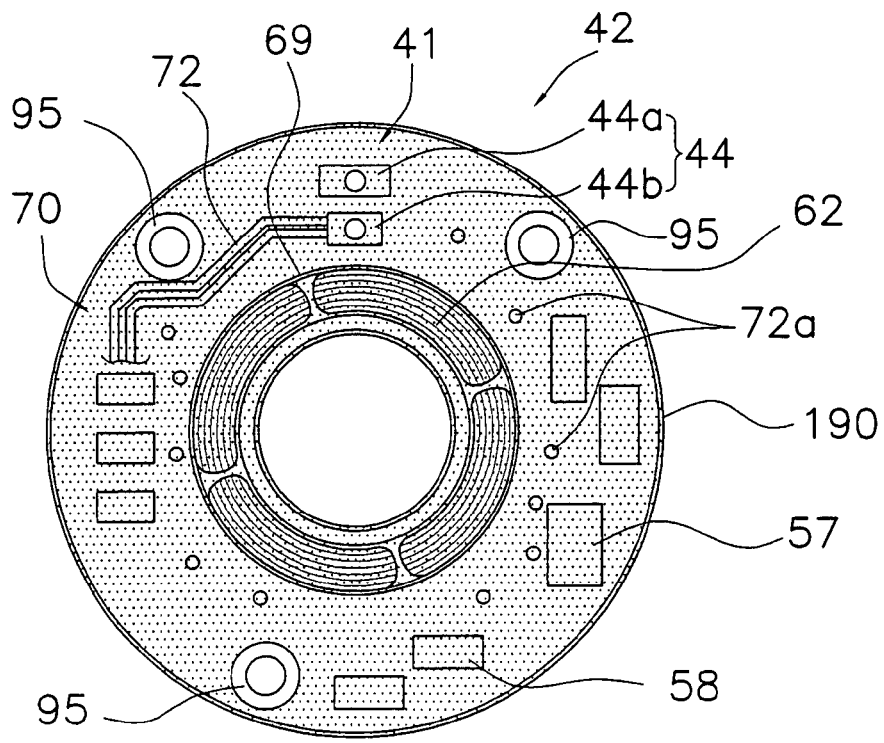
FIG. 14A is a plan view showing the disposition of components on a circuit board in accordance with the second embodiment of the present invention.
Figure 14B:
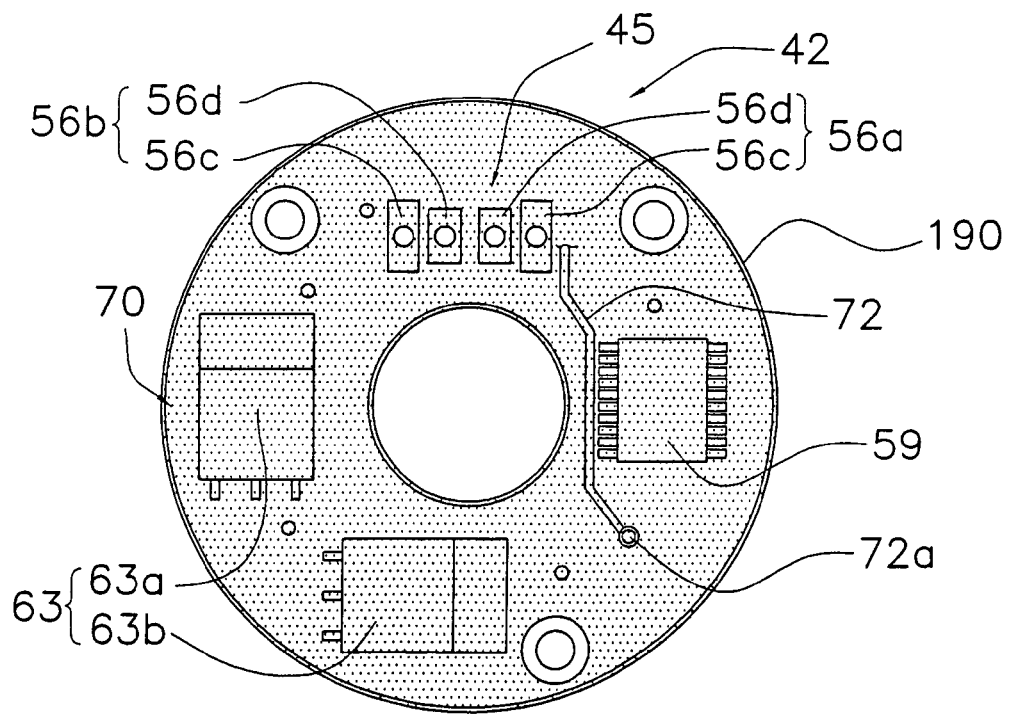
FIG. 14B is a rear plan view showing the disposition of components on a circuit board in accordance with the second embodiment of the present invention.

As shown in FIGS. 12–14A, 14B, in the second embodiment, the switch element 63 includes, for example, two parallel connected FET (field effect transistors) 63a that can switch on and off at a high speed. The serially connected coils 62 are connected to each drain terminal of the FET 63a. As shown in FIG. 14B, the switch element 63 is mounted to the rear surface of the circuit board 70 (the surface on the opposite side of the front surface facing the flange portions 12a).

The rotational speed sensor 41 employs, for example, a reflection type electro-optical sensor 44 that includes a light 44a and a receptor 44b, and is disposed on the front surface of the circuit board 70 that faces the flange portions 12a of the spool 12. A read-out pattern 71 is formed on the outer side surface of the flange portion 12a by any suitable method such as printing, applying a sticker, or attaching a reflective plate, and serves to reflect light illuminated from the light 44a. Signals from the receptor 44b of the rotational speed sensor 41 allow the rotational speed of the spool 12 to be detected so that tension can be applied to the fishing line. The optical sensor is a conventional component that is well known in the art. Therefore, its structure will not be discussed or illustrated in detail herein.

The circuit board 70 is a washer-shaped and ring-shaped substrate having a circular opening in the center thereof, and is disposed on the outer peripheral side of the bearing accommodation portion 14 so as to be substantially concentric with the spool shaft 20. As shown in FIGS. 14A and 14B, the circuit board 70 includes printed circuits 72 on the front surface of the circuit board 70, on which the coils 62 are mounted, and on the rear surface of the circuit board 70. Note that the printed circuits 72 are only partially shown in FIGS. 14A and 14B. Portions of the printed circuits 72 on the front and rear surfaces of the circuit board 70 are electrically connected by through holes 72a. The circuit board 70 is fixedly attached to the inner side surface of the wall portion 13a of the spool support portion 13 by three screws 92. When the circuit board 70 is to be fixed with the screws 92, then for example a jig that is temporarily positioned on the bearing accommodation portion 14 is used to center the circuit board 70, and the circuit board 70 is then disposed so as to be substantially concentric with respect to the spool shaft 20. In this way, when the circuit board 70 is mounted to the spool support portion 13, the coils 62 fixedly attached to the circuit board 70 will be disposed so that they are substantially concentric with the spool shaft 20.

The pattern identification sensor 45 is provided in order to read out the three types of patterns 76a–76c of the identification pattern 76 formed on the back surface of the knob unit 73 of the brake switch knob 43. The pattern identification sensor 45 is composed of two electro-optical sensors 56a, 56b each having a light emitter portion 56c and a receptor portion 56d. As shown in FIG. 14B, the electro-optical sensors 56a, 56b are symmetrically disposed on the circuit board 70 such that they are aligned on the rear surface of the circuit board 70 that faces the wall portion 13a of the spool support portion 13. In other words, the receptor portions 56d of the electro-optical sensors 56a, 56b are aligned with each other, and the light emitter portions 56c are disposed on the outer sides of the aligned receptor portions 56d. Thus, the receptor portions 56d can be disposed separate from each other, and thus make it difficult for light from the opposite light portion 56c to be erroneously detected. Viewing holes 13d, 13e are formed in the wall portion 13a of the spool support portion 13 such that they are vertically aligned, and allow the electro-optical sensors 56a, 56b to acquire the patterns 76a–76c. Here, the eight levels of braking mode can be identified as discussed above by reading out the three types of patterns 76a–76c. The electro-optical sensors are conventional components that are well known in the art. Therefore, these structures will not be discussed or illustrated in detail herein.

As shown by the dots in FIGS. 13 and 14A, 14B, both the circuit board 70 and the electrical components mounted on both sides thereof (such as the coils 62 and the microcomputer 59) are covered with an insulating coating film 190 (another example of the first synthetic resin coating film) made from a synthetic resin insulating material that is translucent yet colored so that light will only partially pass through the insulating coating film 190. The insulating coating film 190 is formed by a hot melt molding process in which a resin raw material is injected into a mold 101 in which a circuit board 70 having electrical components such as the microcomputer 59 and electro-optical sensors 44, 45a, 56b has been set by the aforementioned immersing process. However, the insulating coating film 190 is not formed on the front and rear sides of regions 95, on which head portions 92a of the screws 92 are disposed, or on the light emitter portions of the lights 44a, 56c and receptor portions of the receptors 44b, 56d of the electro-optical sensors 44, 55a, 56b.

The reason why the insulating coating film 190 is not formed on the regions 95 on which the head portions 92a of the screws 92 are disposed is because if the insulating coating film 190 is formed on the regions 95 on which the head portions 92a of the screws 92 are disposed, the insulating coating film 190 will delaminate due to contact between the heat portions 92a and the insulating coating film 190 when the screws 92 are screwed into the circuit board 70. This delamination may spread the entire circuit board 70. However, if the regions 95 on which the head portions 92a of the screws 92 are disposed are not covered with the insulating coating film 190, the head portions 92a will not come into contact with the insulating coating film 190 when the screws 92 are screwed into the circuit board 70. Because of this, the insulating coating film 190 will not delaminate, and it will be difficult for bad insulation due to delamination to occur.

In addition, if the insulating coating film 190 covers light emitter portions of the light emitters 44a, 56c and receptor portions of the receptors 44b, 56d of the electro-optical sensors 44, 55a, 56b, the amount of light that is emitted from the light emitters 44a, 56c, the amount of light reflected from the read-out pattern and the identification pattern, and the amount of light received by the receptors 44b, 56d will be reduced, and thus the light may not be correctly detected by the receptors 44b, 56d, even if these components are covered with a transparent insulating coating film. However, in the second embodiment, a reduction in the light that radiates from the lights 44a, 56c and is reflected by the patterns can be prevented because the light emitters and the receptors are not covered by the insulating coating film 190. Because of this, it will be possible to prevent operational errors in the electro-optical sensors 44, 56a, 56b that occur due to a reduction in the amount of light received by the receptors 44b, 56d or the wrong light being received by the receptors 44b, 56d. In addition, the peripheries of the light emitter portions and receptor portions are shielded. Thus, it will be difficult for light to be emitted from the peripheries of the light portions and receptor portions because a synthetic resin that is difficult for colored light to pass through is used for the insulating coating film 190. Light is also difficult to be emitted because the insulating coating film 190 is formed so as to surround the peripheries of the light emitters 44a, 56c and the receptors 44b, 56d of the electro-optical sensors 44, 56a, 56b with tube shapes such that the top portions of these components are open. Thus, even if the lights 44a, 56c and the receptors 44b, 56d are disposed close to each other, it will be difficult for light to be emitted directly from the light emitters 44a, 56c to the receptors 44b, 56d. Thus, operational errors can be prevented.

The steps of forming the insulating coating film 190 that covers both the electrical components and the circuit board 70 will now be described.

When each electrical component such as the coils 62 and microcomputer 59 have been mounted to the circuit board 70 and wiring has been completed, both the regions in which the head portions 92a of the screws 92 are disposed and the light emitter portions of light emitters 44a, 56c and the receptor portions of the receptors 44b, 56d of the electro-optical sensors 44, 56a, 56b are masked with tape or by printing. Then, the masked circuit board 70 is immersed into a tank filled with a synthetic resin insulating material. Afterward, the circuit board 70 is removed from the tank and subjected to a hardening process in order to form the insulating coating film 190 on the surfaces of the circuit board 70. After covering each unit on the circuit board 70 in this manner with the insulating coating film 190 made of an insulating material, liquids can be prevented from entering the electrical components such as the microcomputer 59. Moreover, in this embodiment, it will be unnecessary to replace the electric power source because the electrical power that is generated will be stored in the condenser element 57 and this electrical power will be used to operate the controller 55 and the like. Because of this, the sealing of the insulating coating film 190 can be made permanent, and trouble caused by bad insulation can be further reduced.

Modification

Figure 15:
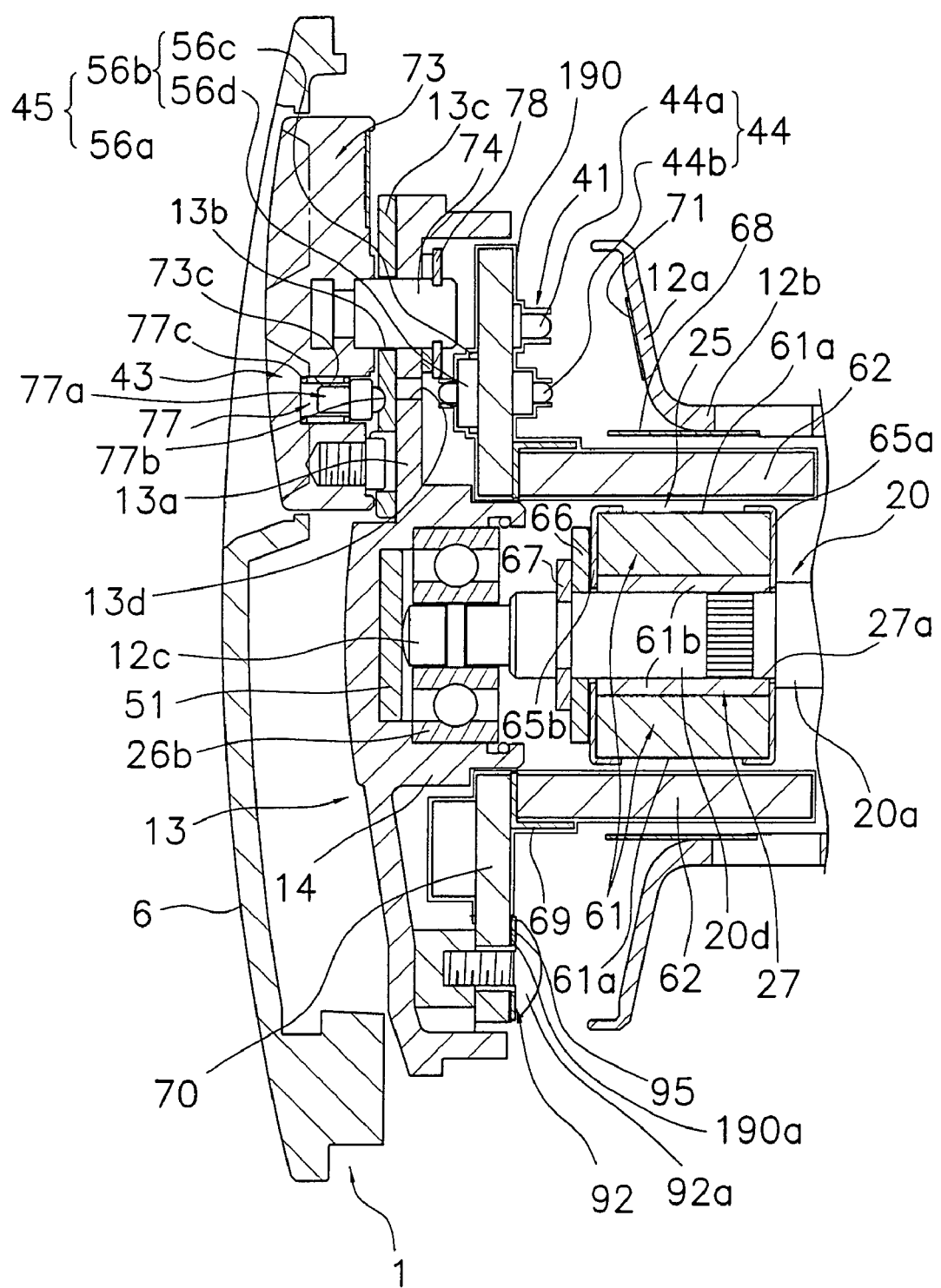
FIG. 15 is an exploded perspective view of a spool brake mechanism in accordance with a modified embodiment of the present invention.

In the aforementioned the second embodiment, an insulating coating film 190 was not formed on the regions in which the screws (screw members) are disposed. However, as shown in FIG. 15, an insulating coating film 190*a* is formed on the regions 95, such that its thickness is thinner on the regions 95 than that of the insulating coating film 190 on other areas. Here, because the regions on which the head portions 92*a* of the screws 92 are disposed is covered with the thin insulating coating film 190*a*, the border between the thin insulating coating film 190*a* and the thick insulating coating film 190 will stop delamination. Thus, it will be difficult for bad insulation due to delamination to occur, even if the thin insulating coating film 190*a* is damaged and delaminates when the screws 92 are screwed into the circuit board 70.

Third Embodiment

In a third embodiment, explanation is given concerning when insulating coating film is formed with hot melt molding method. Furthermore, in the following discussion of the third embodiment, explanation of constitution and operation that are identical or equal with those of the first and second embodiments will be omitted.

Figure 16:
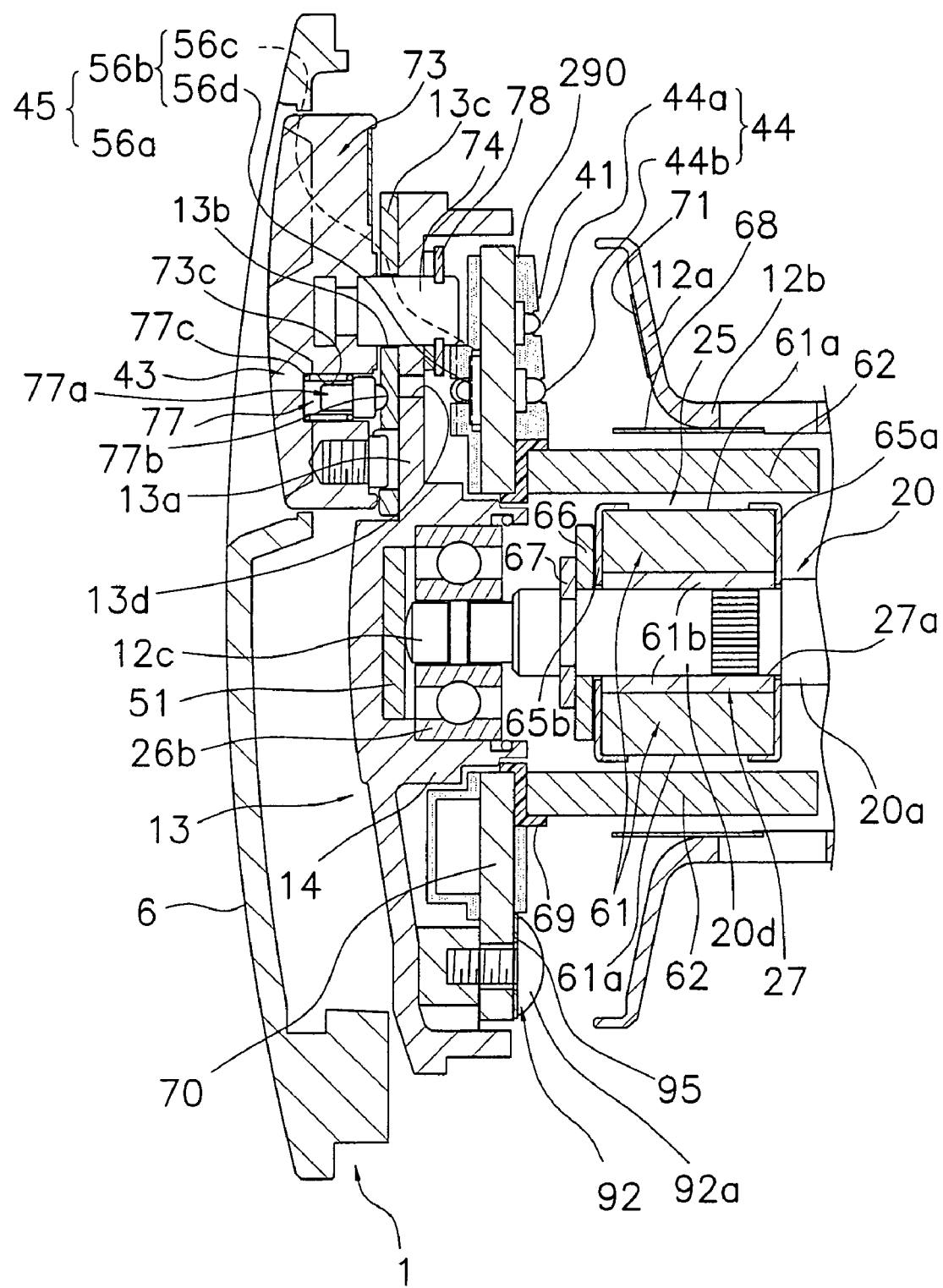
FIG. 16 is a magnified cross-sectional view of the spool brake mechanism in accordance with a third embodiment of the present invention.
Figure 17A:
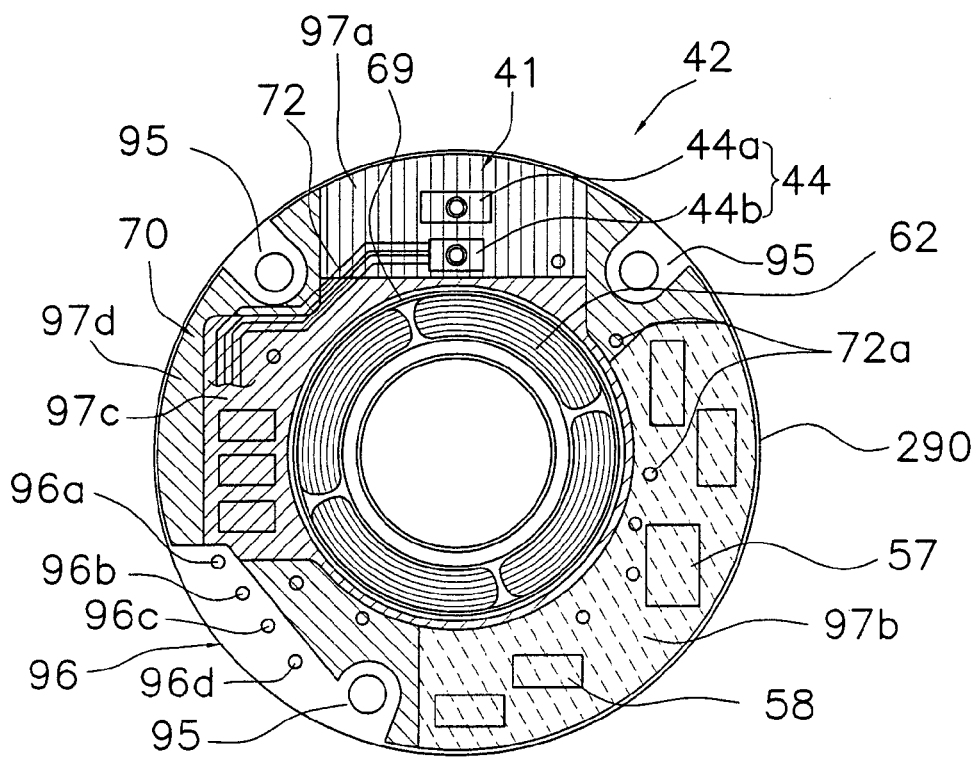
FIG. 17A is a plan view showing the disposition of components on a circuit board in accordance with the third embodiment of the present invention.
Figure 17B:
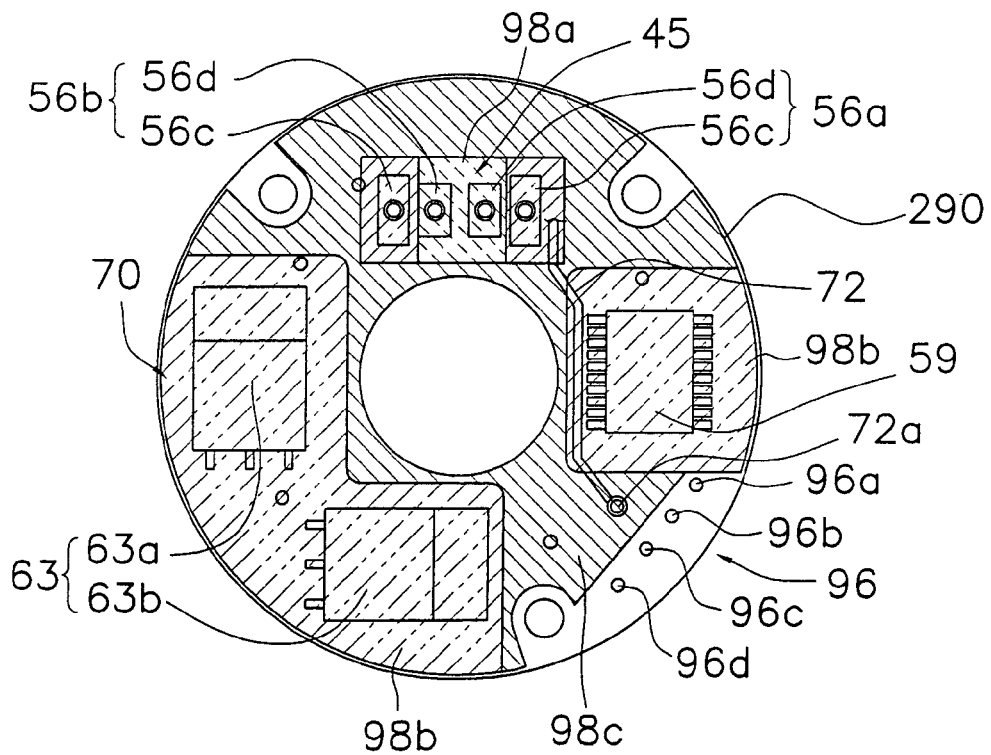
FIG. 17B is a rear plan view showing the disposition of components on a circuit board in accordance with the third embodiment of the present invention.

As shown in FIGS. 16 and 17A, 17B, in the third embodiment, the switch element 63 includes, for example, two parallel connected FET (field effect transistors) 63*a* that can switch on and off at a high speed. The serially connected coils 62 are connected to each drain terminal of the FET 63*a*. As shown in FIG. 17B, the switch element 63 is mounted to the rear surface of the circuit board 70 (the surface on the opposite side of the front surface facing the flange portions 12*a*).

The circuit board 70 is a washer-shaped and ring-shaped substrate having a circular opening in the center thereof, and is disposed on the outer peripheral side of the bearing accommodation portion 14 so as to be substantially concentric with the spool shaft 20. As shown in FIGS. 17A and 17B, the circuit board 70 includes printed circuits 72 both on the front surface of the circuit board 70 on which the coils 62 are mounted, and on the rear surface of the circuit board 70. Note that the printed circuits 72 are only partially shown in FIGS. 17A and 17B. Portions of the printed circuits 72 on the front and rear surfaces of the circuit board 70 are electrically connected through through holes 72*a*. An external equipment connector 96 is formed on the outer peripheral side of the circuit board 70, which for example serves to connect an inspection device (an example of external equipment) that inspects whether or not the electronic circuit is operating normally. Four connection points 96*a*–96*d* that can electrically connect to the inspection device are formed in the external equipment connector 96.

The circuit board 70 is fixedly attached to the inner side surface of the wall portion 13*a* of the spool support portion 13 by three screws 92. When the circuit board 70 is to be attached with the screws 92, then for example a jig that is temporarily positioned on the bearing accommodation portion 14 is used to center the circuit board 70, and the circuit board 70 is then disposed so as to be substantially concentric with respect to the spool shaft 20. In this way, when the circuit board 70 is mounted to the spool support portion 13, the coils 62 fixedly attached to the circuit board 70 will be disposed so that they are substantially concentric with the spool shaft axis.

Note that the rectifier circuit 58 and the electricity storage element 57 are both provided on the circuit board 70. As shown by the dots in FIGS. 16 and 17A, 17B, both the circuit board 70 and the electrical components mounted on both sides thereof (such as the microcomputer 59) are covered with a molded insulating coating film 290 (another example of the first synthetic resin coating film) made from a synthetic resin insulating material that is colored such that light will only partially pass through the molded insulating coating film 290. The molded insulating coating film 290 is formed by a hot melt molding process. In the hot melt molding process, a resin raw material is injected into a mold 101 (FIG. 18) in which a circuit board 70 having electrical components such as the microcomputer 59 and electro-optical sensors 44, 45*a*, 56*b* is set. However, the molded insulating coating film 290 is not formed on the front and rear sides of regions 95 on which head portions 92*a* of the screws 92, or the light emitter portions of the light emitters 44*a*, 56*c* and receptor portions of the receptors 44*b*, 56*d* of the electro-optical sensors 44, 55*a*, 56*b* are to be disposed. In addition, the molded insulating coating film 290 is not formed on a region on which an external device connector 96 is formed. This way, it is possible to eliminate the task of removing the molded insulating coating film 290 when using each connecting point 96*a*–96*d* on the external device connector 96 to inspect whether or not the circuit is normal during the manufacture of the circuit board 70. Note that when the inspection of the circuit is completed, an insulating coating film 290 is formed by, for example, a hot melt spray process on the region on which the external device connector 96 was formed.

As shown in FIG. 17A, the molded insulating coating film 290 formed with different thicknesses on four regions on the surface of the circuit board. The four regions include an inclined first region 97*a* on which the electro-optical sensor 44 is disposed, a second region 97*b* that has, for example, a thickness of 3.3 mm and on which the electricity storage element 57 and the rectifier circuit 58 are disposed, a third region 97*c* that has, for example, a thickness of 2.5 mm around the periphery of the coils, and a fourth region 97*d* that has a thickness of, for example, 1 mm.

On the first region 97*a* in which a light emitter portion of the light emitter 44*a* and a receptor portions of the receptor 44*b* of the electro-optical sensor 44 are disposed, as shown in FIGS. 16 and 17A, 17B, the molded insulating coating film 290 is formed such that it is inclined from the third region 97*c* toward the outer peripheral edge of the circuit board 70 so that the light emitter 44*a* and the receptor 44*b* are bundled together.

As shown in FIG. 17B, on the rear surface of the circuit board 70, the molded insulating coating film 290 is formed with different thicknesses on three regions. The three regions including an inclined first region 98*a* that has, for example, thicknesses of 2.2 mm and 1.8 mm and on which the two electro-optical sensors 56*a*, 56*b* are disposed, a second region 98*b* that is divided into two portions and has, for example, a thickness of 2.8 mm, and on which the microcomputer 59 and the switch element 63 are disposed, and a third region 98*c* that has, for example, a thickness of 1 mm.

With the light emitter portions of the lights 56c and the receptor portions of the receptors 56d of the electro-optical sensors 56a, 56b, the molded insulating film 290 is formed such that the thickness of the molded insulating coating film 290 in the first region 98a is different around the light emitters 56c and around the receptors 56d (the thickness around the light emitters 56c is 2.2 mm and the thickness around the receptors 56d is, for example, 1.8 mm). The molded insulating film 290 is also formed such that the first region 98a projects outward from the circuit board 70 more than the third region 98c, so that the two sensors 56a, 56b are bundled together. Thus, by bundling the light emitters and receptors 44a, 56c, 44b, 56d and the two optical sensors 56a, 56b together, the shape of mold 191 from which the molded insulating coating film 290 that covers the electrical components such as the light emitters 44a, 56c, the receptors 44b, 56d, the microcomputer 59 and the switch element 63 is created can be simplified. Therefore, molding costs can be reduced.

Furthermore, the molded insulating coating film 290 is formed on first regions 97a, 98a so that the molded insulating coating film 290 surrounds the peripheries of the lights 44a, 56c and the receptors 44b, 56d with tube shapes such that the top portions of these components are open. A portion of the molded insulating coating film 290 that surrounds the light emitter portions and receptor portions of the light emitters and receptors 44a, 56c, 44b, 56d with tubular shapes function as a light shield with respect to the lights and the receptors.

A water-repelling layer is formed on the inner peripheral surfaces of the tubular portions of the molded insulating coating film 290 and on the light emitters and receptor portions by, for example, spraying a water repellant layer thereon. Thus, it will be difficult for moisture to remain because the light emitter and receptor portions are surrounded with tubular shapes, even if moisture adheres to the inner peripheral surfaces of the tubular portions. Thus, contamination caused by the deposit of impurities contained in moisture can be controlled, and declines in the light reception/emission efficiency of the light emitter portions and the receptor portions caused by this contamination can be controlled.

The reason why the molded insulating coating film 290 is not formed on the regions 95 on which the head portions 92a of the screws 92 are disposed is because if the molded insulating coating film 290 is formed on the regions 95 on which the head portions 92a of the screws 92 are disposed, the molded insulating coating film 290 will delaminate due to contact between the heat portions 92a and the molded insulating coating film 290 when the screws 92 are screwed into the circuit board 70. This delamination may occur over the entire circuit board 70. However, if the regions 95 on which the head portions 92a of the screws 92 are disposed are not covered with the molded insulating coating film 290, the head portions 92a will not come into contact with the molded insulating coating film 290 when the screws 92 are screwed into the circuit board 70. Because of this, the molded insulating coating film 290 will not delaminate, and it will be difficult for bad insulation due to delamination to occur.

In addition, if the molded insulating coating film 290 covers light emitter portions of the lights 44a, 56c and receptor portions of the receptors 44b, 56d of the electro-optical sensors 44, 55a, 56b, the amount of light that is emitted from the lights 44a, 56c, the amount of light reflected from the read-out pattern and the identification patter, and the amount of light received by the receptors 44b, 56d will be reduced, and thus the light may not be correctly detected by the receptors 44b, 56d, even if these components are covered with a transparent insulating coating film.

However, in the present embodiment, a reduction in the light that radiates from the light emitters 44a, 56c and is reflected by the patterns can be prevented because the light emitters and the receptors are not covered by the molded insulating coating film 290. Because of this, it is possible to prevent operational errors in the electro-optical sensors 44, 56a, 56b that occur due to a reduction in the amount of light received by the receptors 44b, 56d or the wrong light being received by the receptors 44b, 56d. In addition, the peripheries of the light emitter portions and receptor portions are shielded, and thus it will be difficult for light to be emitted from the peripheries of the light emitter portions and receptor portions because a synthetic resin is used for the molded insulating coating film 290 that is difficult for colored light to pass through, and because the molded insulating coating film 290 is formed so that the molded insulating coating film 290 surrounds the peripheries of the light emitters 44a, 56c and the receptors 44b, 56d of the electro-optical sensors 44, 56a, 56b with tube shapes such that the tops thereof are open. Thus, even if the light emitters 44a, 56c and the receptors 44b, 56d are disposed close to each other, it will be difficult for light to be emitted directly from the light emitters 44a, 56c to the receptors 44b, 56d, and thus operational errors can be prevented.

The steps of forming the molded insulating coating film 290 so that the peripheries of the circuit board 70 are covered will be described by means of FIGS. 18–21.

Figure 18:
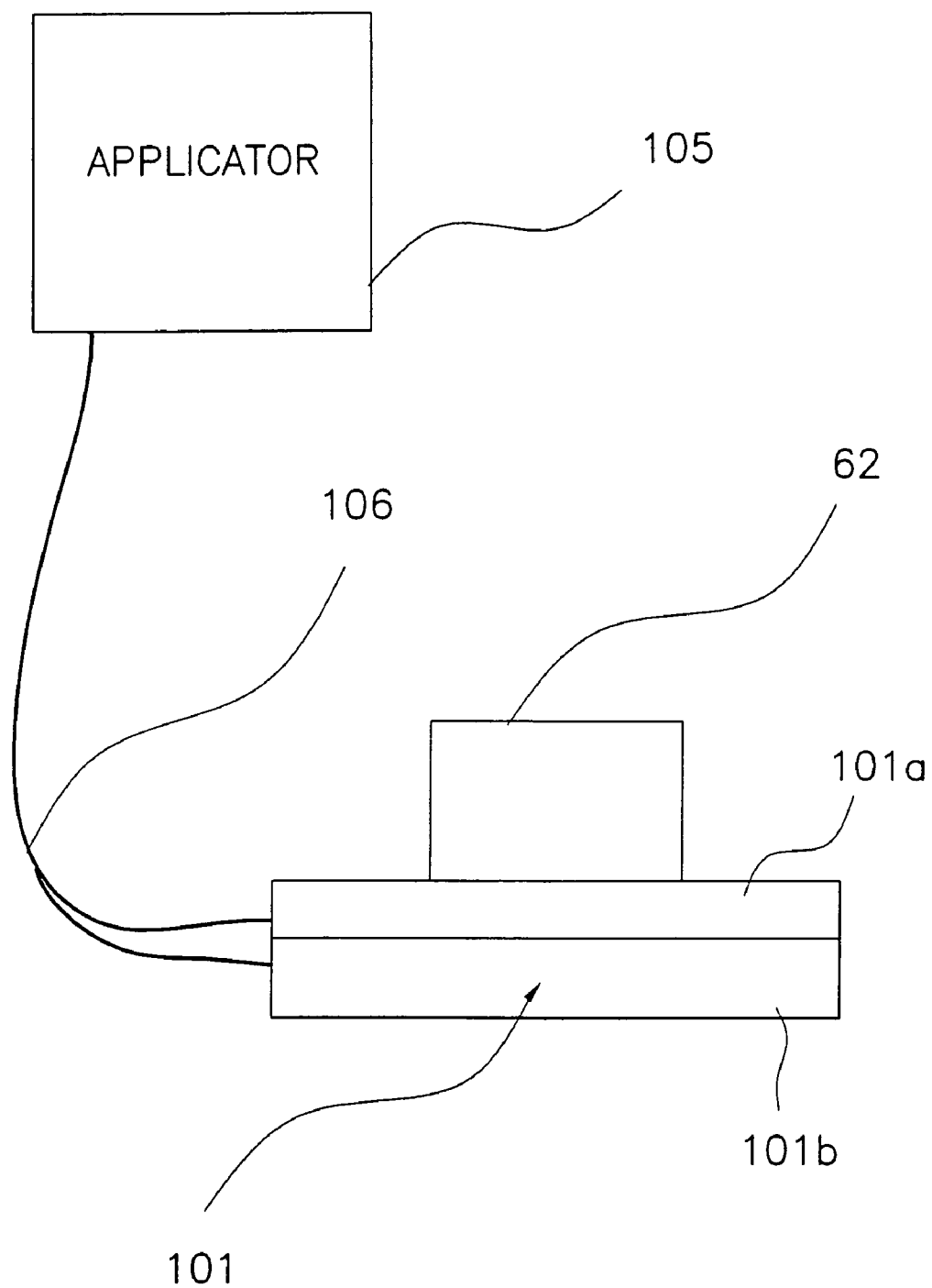
FIG. 18 is a schematic diagram of a hot melt processing device.

As shown in FIG. 18, a hot melt processing device will be used when the molded insulating coating film 290 is to be formed by a hot melt molding process. In the hot melt processing device, a hot melt sealant made from, for example, a plastic polyamide resin (resin raw material) is melted, and the sealant is supplied to the mold 101 at a low temperature and a low pressure via a hose 106.

Figure 19:
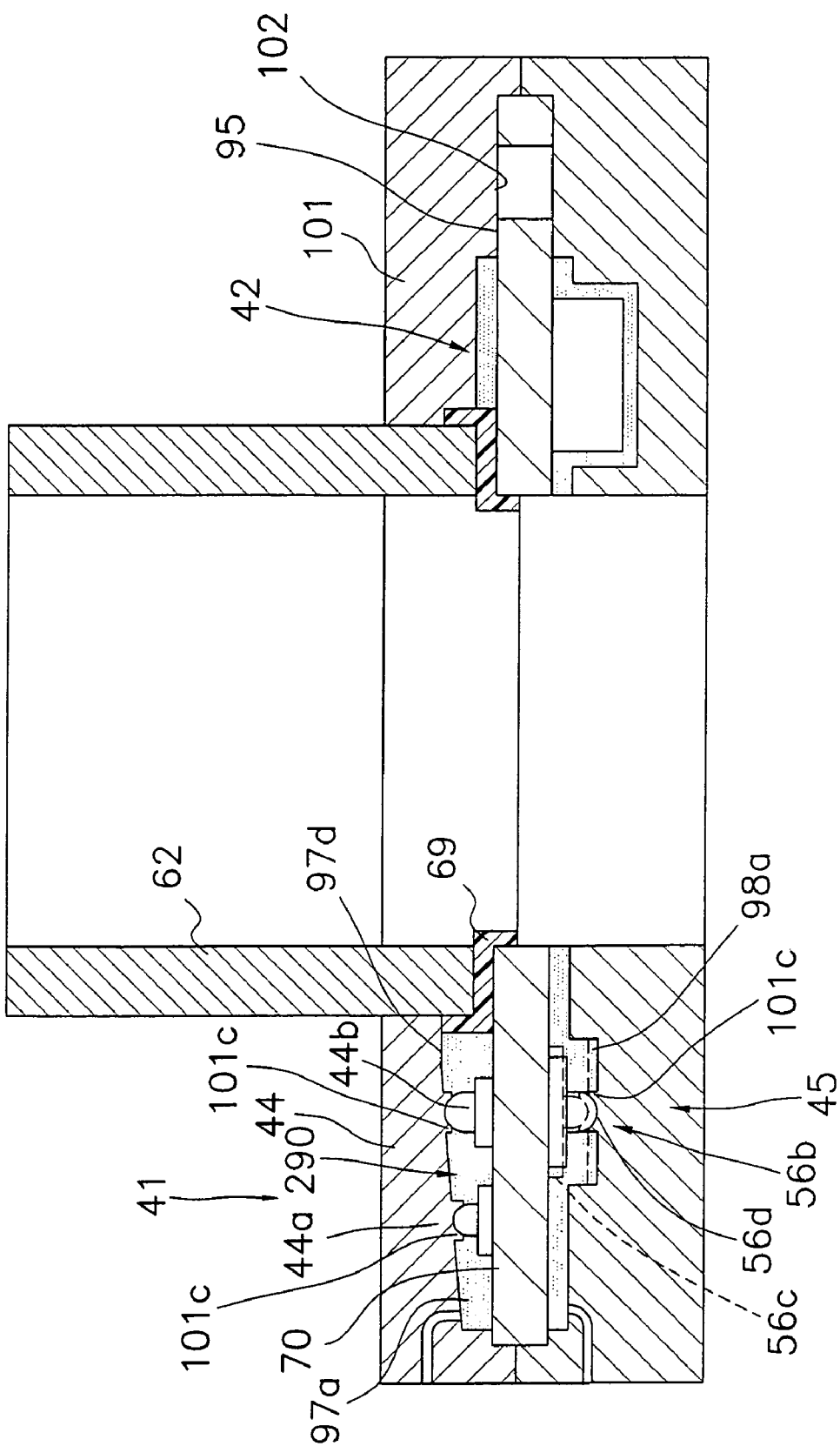
FIG. 19 is a cross sectional view showing the structure of a mold.

As shown in FIG. 19, the mold 101 is donut shaped, and includes an upper mold 101a and a lower mold 101b. The mold 101 includes a molding space in between the upper mold 101a and the lower mold 101b in which the circuit board 70 on which electronic components such as the microcomputer 59 are mounted is positioned. Gaps between the upper and lower molds 101a and 101b and the circuit board 70 and the electronic components, in which the molded insulating coating film 290 can be formed, are formed in the molding space 102. Here, there is no gap formed between the upper and lower molds 101a and 101b and the circuit board 70 on the regions 95 on which the head portions 92a of the screws 92 of the control board 70 are disposed, such that the molding insulating coating film 290 will not be formed therebetween. Also because an insulating coating film is already formed on the coils 62, the molded insulating coating film 290 will not be formed thereon in this molding process. In addition, the coil holder 69 is used for alignment with the mold 101 and for sealing the gaps in the mold 101. Furthermore, a plurality of projections 101c that contact with the light emitter and receptor portions are provided on the mold 101, and serve to surround the light emitter and receptor portions of the electro-optical sensor 44 and the electro-optical sensors 56a, 56b with tubular spaces which are open at their ends. Moreover, large recessed portions are formed around the peripheries of the electrical components such as the light emitter and receptor 44a, 44b of the electro-optical sensor 44, the two electro-optical sensors 56a, 56b, the microcomputer 59, and the switch element 63, so that these elements are grouped together and are covered by the molded insulating coating film 290. The first to third regions 97a–97c on the front surface and the surfaces of the first and second regions 98a, 98b on the rear surface are formed as these recessed portions. This allows the shape of the mold to be simplified and molding costs to be reduced.

Figure 20:
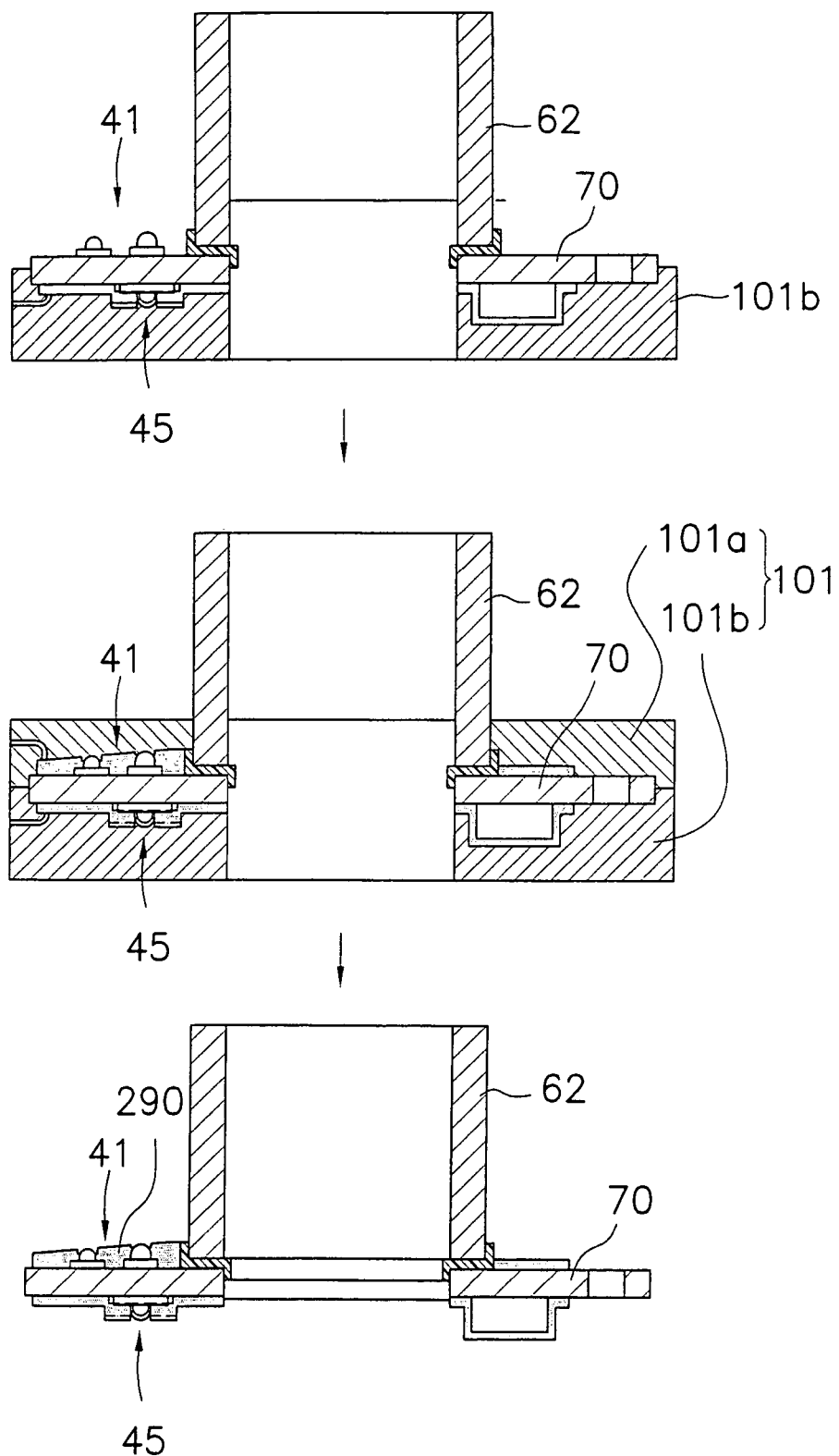
FIG. 20 shows the steps in a hot melt process.

As shown in FIG. 20, when the molded insulating coating film 290 is to be formed, the circuit board 70 having the coils 62 and the electronic components mounted thereon is positioned and set into the lower mold 101b. Then, the upper mold 101a is mounted on the lower mold 101b and clamped. In this state, a melted hot melt sealant is supplied to the upper and lower molds 101a, 101b from the applicator 105 via the hose 106 at, for example, a low temperature between 140 and 200 degrees centigrade and a low pressure of 2 to 5 MPa. As a result, the hot melt sealant will be supplied to the gaps between the circuit board 70 and the electrical components and the upper and lower molds 101a, 101b. Then, when the hot melt sealant is cooled, the circuit board 70 is removed from the mold 101. When this occurs, the molded insulating coating film 290 will be formed on both surfaces of the circuit board 70. In addition, the regions 95 in which the head portions 92a of the screws 92 are disposed, the external device connector 96, and the regions 97 in which the light emitter and receptor portions of the electro-optical sensors 44, 56a, 56b are disposed are masked by the mold 101, and thus the molding insulating coating film 290 is not formed there.

The electronic circuit will be inspected after the molded insulating coating film 290 is formed thereon. When conducting an inspection, four pins of an inspection device are connected to each of the terminals 96a–96d of the external device connector 96. The results of the measurements are checked to determine whether or not they have the desired values, and the circuit inspection and the inspection of the insulation are performed simultaneously. When the inspection is completed, an insulating coating film is formed on the external device connector 96 by a hot melt spray process.

By covering each unit on the circuit board 70 in this manner with a molded insulating coating film 290 made of an insulating material, liquids can be prevented from entering the electrical components such as the microcomputer 59. Moreover, in this embodiment, it will be unnecessary to replace the electric power source because the electrical power that is generated will be stored in the condenser element 57 and this electrical power will be used to operate the controller 55 and the like. Because of this, the sealing of the molded insulating coating film 290 can be made permanent, and trouble caused by bad insulation can be further reduced.

Figure 21:
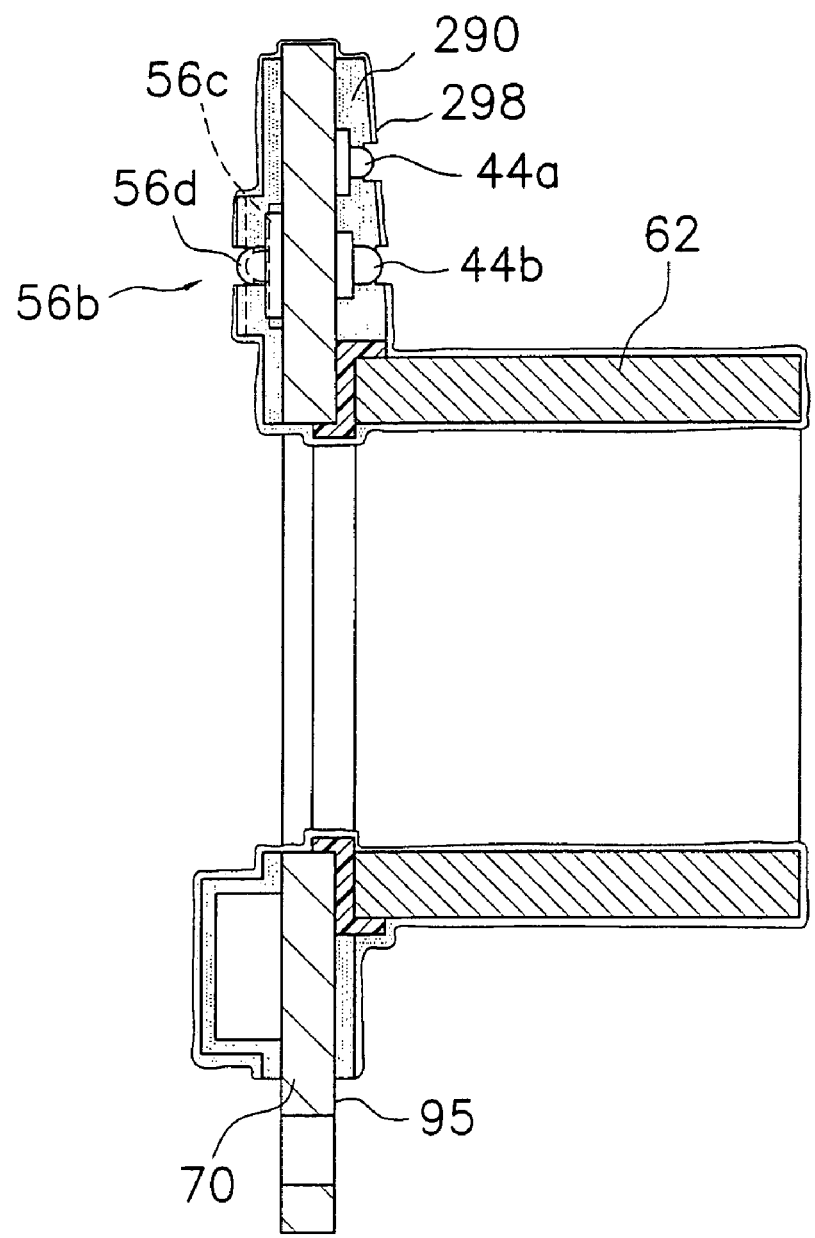
FIG. 21 is a partial exploded perspective view of a spool brake mechanism in accordance with the third embodiment of the present invention.

In the aforementioned third embodiment, an insulating coating film is simply formed on the external connector 96 by a hot melt spray process after the molded insulating coating film 290 is formed. However, as shown in FIG. 21, a non-molded insulating coating film 298 (an example of second synthetic resin coating film) may also be formed on the surface of the molded insulating coating film 290 by an immersion process. The non-molded insulating coating film 298 is formed in the following manner. When the inspection of the circuit is completed, the regions 95 in which the head portions 92a of the screws 92 are disposed, and the light emitter portions of the light emitters 44a, 56c and the receptor portions of the receptors 44b, 56d of the electro-optical sensor 44, 56a, 56b are masked with tape or by printing. Then, the masked circuit board 70 is immersed in a tank which contains a liquid synthetic resin, and the masked circuit board 70 is then removed from the tank and subjected to a hardening process in order to form the non-molded insulating coating film 298 on the surface of the masked circuit board 70.

Thus, the insulating performance can be further improved by forming the non-molded insulating coating film 298 on a surface on which the molded insulating coating film 290 was formed and/or on a surface on which the molded insulating coating film 290 was not formed.

Other Embodiments (a) In the aforementioned embodiment, four magnets (magnetic poles) were disposed in the rotational direction around the rotor element 60. However, any number of magnets may be used so long as there is a plurality of magnets. However, it is preferable that between 3 and 8 magnets are used. In addition, it is preferable, but not necessary, that the number of coils used equal the number of magnets (magnetic poles) used.

(b) In the aforementioned embodiment, the rotor element 60 was constructed by a plurality of magnets 61. However, for example, the rotor element 60 may be unitarily formed with a tubular plastic magnet or the like having a rare earth metal if the tubular plastic magnet includes magnetic poles that are sequentially disposed such that their polarities are different in the peripheral direction.

(c) In the aforementioned embodiment, the circuit board 70 is fixedly coupled to the spool support portion 13 so as to be centered with respect to the spool shaft 20 by a jig. However, for example, the inner peripheral surface of the circuit board 70 or the inner peripheral surface of the coil holder 69 may be fitted to the outer peripheral surface of the bearing accommodation portion 14 so that the circuit board 70 is disposed substantially concentric with the axis of the spool shaft 20.

(d) In the aforementioned embodiment, the magnets 61 are retained by the cap members 65a, 65b. However, for example, the outer periphery of the magnets 61 may be covered with a heat shrinkable tube to retain the magnets 61 on the spool shaft 20. Here, the heat shrinkable tube may be mounted after the cap members 65a, 65b are mounted.

(e) In the aforementioned embodiment, the magnets 61 are retained by the pair of cap members 65a, 65b. However, the magnets 61 may be interposed between a cap member on one side and a disk-shaped positioning member on the other side.

According to the present invention, the coil mounted around the periphery of the rotor element can be directly attached to the circuit board because the circuit board is mounted to a surface that faces the spool of the reel unit. Because of this, a lead wire that connects the coils and the circuit board will be unnecessary, and bad insulation between the coils and the circuit board can be reduced. Moreover, the coil is also mounted to the reel unit by simply attaching the circuit board to the reel unit because the coil is mounted to the circuit board that is attached to the reel unit. Because of this, the braking device can be easily assembled.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A braking device for a dual bearing reel that brakes a spool that is rotatively mounted on a reel unit, said braking device comprising:
    a spool braking unit that brakes the spool, the spool braking means including
        a rotor element that rotates together with the spool and includes a plurality of magnetic poles that are arranged around a rotational direction of the rotor element such that polarities of the magnetic poles are sequentially different,
        a plurality of serially connected coils that are disposed around a periphery of the rotor element in the circumferential direction, and
        switch means that is connected to both ends of the plurality of coils; and
    a spool control unit that electrically controls the spool braking unit, the spool control unit including
        a circuit board on which the switch means and the plurality of coils are mounted, the circuit board being mounted on a surface of the reel unit that faces one end surface of the spool, and
        a control element that is mounted on the circuit board.

2. The braking device for a dual bearing reel set forth in claim 1, wherein
    the spool is non-rotatably mounted to a spool shaft;
    the rotor element includes a plurality of magnets that are fixedly attached to the spool shaft, and
    the plurality of magnets are arranged around the rotational direction of the rotor element such that the polarities of the magnets are sequentially different.

3. The braking device for a dual bearing reel set forth in claim 2, further comprising
    a cap member that is formed from a non-magnetic material and is disposed at end portions of the plurality of magnets in the spool shaft direction, such that the plurality of magnets are retained on the spool shaft by the cap member and the plurality of magnets are disposed substantially concentric with the spool shaft.

4. The braking device for a dual bearing reel set forth in claim 2, wherein
    the number of magnets equals the number of coils.

5. The braking device for a dual bearing reel set forth in claim 1, wherein
    the plurality of coils are coreless coils that are wound into a rectangular frame shape and further curved into arc shapes along a rotational direction of the spool.

6. The braking device for a dual bearing reel set forth in claim 1, wherein
    the circuit board has a coil holder formed from a non-magnetic material and attached thereto; and
    the coils are fixedly attached to the circuit board by being mounted to the coil holder.

7. The braking device for a dual bearing reel set forth in claim 1, wherein
    the spool is non-rotatably mounted to a spool shaft; and
    the plurality of coils are disposed so as to be substantially concentric with an axial center of the spool shaft.

8. The braking device for a dual bearing reel set forth in claim 1, wherein
    the spool is non-rotatably mounted to a spool shaft; and
    the circuit board is a washer-shaped member that is disposed so as to be substantially concentric with the spool shaft.

9. The braking device for a dual bearing reel set forth in claim 1, further comprising
    a first synthetic resin coating film that coats at least a part of the spool control unit and is made of an insulating material.

10. The braking device for a dual bearing reel set forth in claim 1, wherein
    the spool control means further includes a condenser element that is mounted on the circuit board, stores electric power generated in the coils, and supplies the electric power to the control element.

11. The braking device for a dual bearing reel set forth in claim 1, further comprising
    electro-optical detection means that is mounted on the circuit board and detects a rotational speed of the spool;
    wherein the spool control unit brakes the spool based on the rotational speed of the spool detected by the electro-optical detection means.

12. The braking device for a dual bearing reel set forth in claim 9, wherein
    the first synthetic resin coating film is adhered to and formed integral with the spool control unit and the coils respectively by immersing the spool control unit and coils in a liquid synthetic resin base material.

13. The braking device for a dual bearing reel set forth in claim 9, wherein
    the first synthetic resin coating film is made from a synthetic resin that is formed by a hot melt molding process, in which a resin raw material is injected into a mold, such that the first synthetic resin covers at least a portion of the circuit board.

14. The braking device for a dual bearing reel set forth in claim 13, further comprising
    a second synthetic resin coating film that coats at least a part of the coils and a part of the spool control unit on which the first synthetic resin coating film is coated, the second synthetic resin coating film being made of an insulating material.

15. The braking device for a dual bearing reel set forth in claim 9, wherein
    the first synthetic resin coating film is a translucent coating film.

16. The braking device for a dual bearing reel set forth in claim 9, wherein
   the first synthetic resin coating film is a colored synthetic resin through which light passes only partially.

17. The braking device for a dual bearing reel set forth in claim 9, wherein
   the circuit board is mounted to the reel unit with a plurality of screw members having head portions, and
   the first synthetic resin does not cover portions of the spool control unit on which the head portions of the screw members are disposed.

18. The braking device for a dual bearing reel set forth in claim 9, wherein
   the circuit board is mounted to the reel unit by a plurality of screw members having head portions, and
   a thickness of the first synthetic resin coating film formed on portions of the spool control unit on which head portions of the screw members are disposed is thinner than a thickness of the first synthetic resin coating film formed on other portions of the spool control unit.

* * * * *